United States Patent
Van Deman

(10) Patent No.: US 11,206,269 B1
(45) Date of Patent: Dec. 21, 2021

(54) MANAGING NON-PERSISTENT PRIVILEGED AND NON-PRIVILEGED OPERATOR ACCESS TO INFRASTRUCTURE SYSTEMS HOSTED IN A CLOUD COMPUTING ENVIRONMENT

(71) Applicant: Amazon Technologies, Inc., Seattle, WA (US)

(72) Inventor: Frank Leslie Van Deman, Virginia Beach, VA (US)

(73) Assignee: Amazon Technologies, Inc., Seattle, WA (US)

(*) Notice: Subject to any disclaimer, the term of this patent is extended or adjusted under 35 U.S.C. 154(b) by 360 days.

(21) Appl. No.: 16/457,603

(22) Filed: Jun. 28, 2019

(51) Int. Cl.
*H04L 29/06* (2006.01)
*G06F 21/45* (2013.01)

(52) U.S. Cl.
CPC .......... *H04L 63/102* (2013.01); *G06F 21/45* (2013.01); *H04L 63/0884* (2013.01); *H04L 63/108* (2013.01); *G06F 2221/2137* (2013.01)

(58) Field of Classification Search
CPC ............................. H04L 63/102; G06F 21/45
See application file for complete search history.

(56) References Cited

U.S. PATENT DOCUMENTS

| | | | | |
|---|---|---|---|---|
| 5,768,519 A * | 6/1998 | Swift | ................... | H04W 12/086 709/223 |
| 2015/0033305 A1* | 1/2015 | Shear | ................... | G06F 21/6218 726/6 |
| 2016/0028737 A1* | 1/2016 | Srinivasan | ............ | H04L 63/102 726/1 |
| 2016/0364927 A1* | 12/2016 | Barry | ................... | H04L 41/06 |
| 2019/0207772 A1* | 7/2019 | Hecht | ................... | H04L 9/30 |
| 2019/0387000 A1* | 12/2019 | Zavesky | ............... | H04L 63/102 |

OTHER PUBLICATIONS

Frank Leslie Van Deman, "Mastering Identity at Every Layer of the Cake (SEC401-R1)," AWS: re: Invent 2018, published on YouTube Dec. 1, 2018 [<https://www.youtube.com/watch?v=vbjFjMNVEpc>].

* cited by examiner

*Primary Examiner* — Ponnoreay Pich
(74) *Attorney, Agent, or Firm* — Patterson + Sheridan, LLP

(57) ABSTRACT

Techniques for managing access to infrastructure components hosted in a cloud computing environment are provided. One technique includes receiving a request from a user to access a single infrastructure component of multiple infrastructure components hosted in the cloud computing environment. At least one of a current operating state of the cloud computing environment and a context of the user is determined in response to the request. A determination is made to grant the user access to the single infrastructure component, based on an analysis of at least one of the current operating state and the context of the user. In response to the determination, a credential is retrieved that is specific to the single infrastructure component and is valid for a temporary amount of time. The credential is provided to the user.

20 Claims, 13 Drawing Sheets

MANAGING NON-PERSISTENT PRIVILEGED AND NON-PRIVILEGED OPERATOR ACCESS TO INFRASTRUCTURE SYSTEMS HOSTED IN A CLOUD COMPUTING ENVIRONMENT

BACKGROUND

The present disclosure generally relates to cloud computing environments, and more specifically, to techniques for managing non-persistent access to infrastructure components (or systems) (e.g., operating systems, databases, etc.) hosted in a cloud computing environment.

Cloud computing environments (or platforms) provide users and enterprise customers (e.g., organizations, companies, etc.) with a variety of computing services. For example, an Infrastructure-as-a-Service (IaaS) platform may provision virtual server instances and deploy applications on those instances. In another example, the IaaS platform may provision relational database instances to handle application workloads, backups, storage, etc. Each relational database instance can support one or more databases or database schemas. Multiple cloud operators (or administrators) may be responsible for maintaining a cloud computing environment. For example, a cloud operator can monitor infrastructure components (or systems) (e.g., virtual server instances, database instances, etc.) in the cloud environment, perform maintenance on the infrastructure components, install software updates, etc.

In some situations, customers (or tenants) may provide cloud operators access to their infrastructure components in the cloud computing environment in order to, e.g., check logs, install software patches, resolve instance failures or system outages, etc. Currently, the techniques used to provide cloud operators access to a given customer's infrastructure components in the cloud computing environment are fairly static. In the case of non-privileged (or general) operator access, for example, where the non-privileged operator uses regular user credentials to log into a customer domain account, the techniques generally involve connecting to a centralized directory (e.g., Active Directory (AD)) to authenticate and authorize the non-privileged operator's credentials. In the case of privileged operator access, where there is a single privileged credential (e.g., root password for an administrative account), the techniques generally involve vaulting the single privileged credential and distributing (or checking out) the single privileged credential to different privileged operators.

Using these traditional techniques to provide operators access to a customer's infrastructure components enables operators to persistently connect to the customer's infrastructure components. For example, these techniques enable an operator to use their credentials to gain access to the all of the customer's infrastructure components at any time. Providing access control in such a persistent manner is inflexible and increases security risks to the customer's infrastructure components.

BRIEF DESCRIPTION OF DRAWINGS

Various embodiments in accordance with the present disclosure will be described with reference to the drawings, where like designations denote like elements.

DETAILED DESCRIPTION

Figure 1:
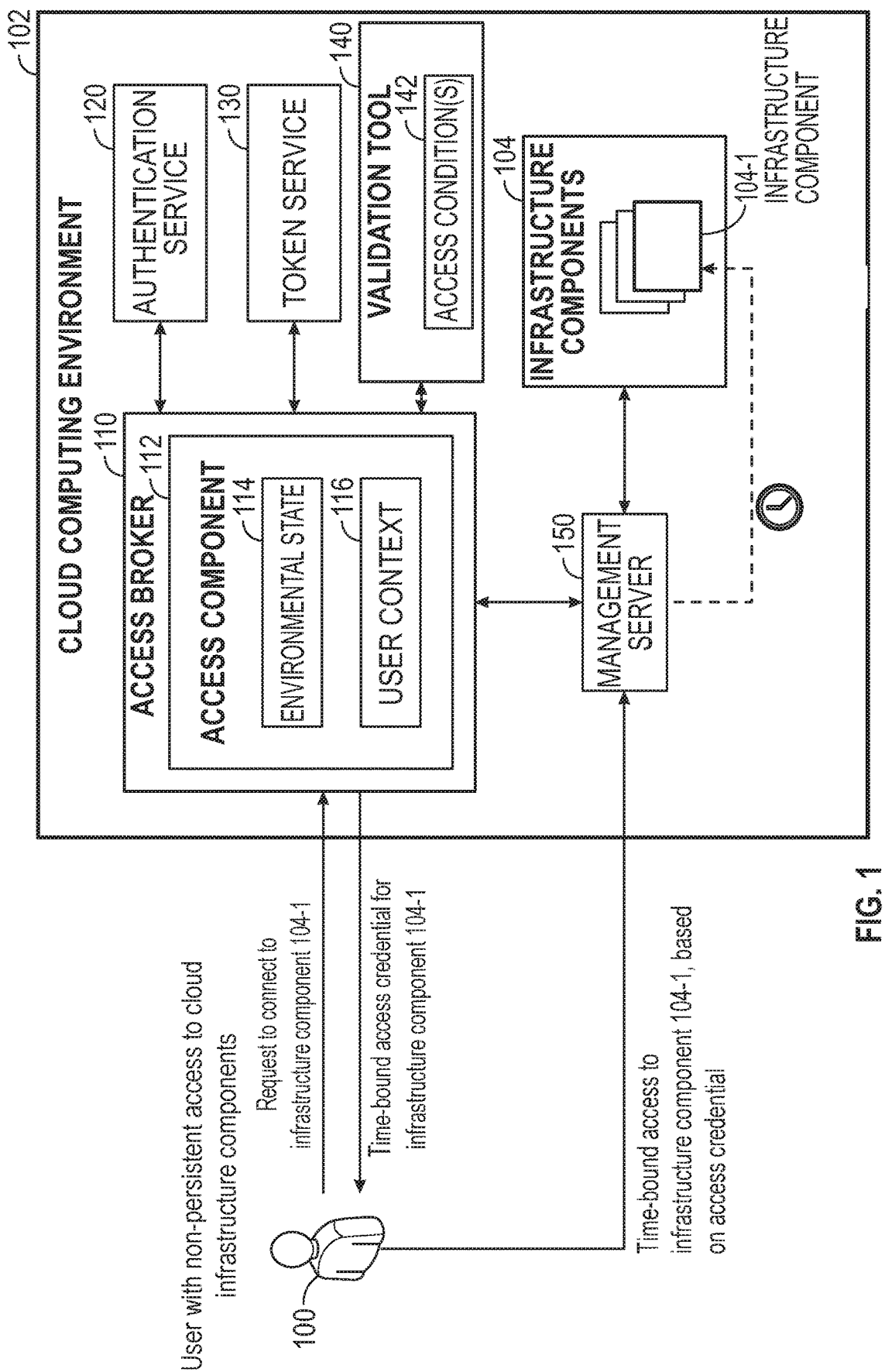
FIG. 1 illustrates an example network architecture for managing operator access to a cloud computing environment, according to one embodiment.

In general, a cloud computing user (or customer) (e.g., individual, organization, companies, etc.) may provide cloud operators access to its infrastructure components hosted in a cloud computing environment to permit the cloud operators to perform a variety of management and maintenance activities (or operations). For example, such activities can include, but are not limited to, inspecting logs of activity or events performed by the infrastructure components, installing software patches (or updates) on the infrastructure components, performing maintenance on the infrastructure components, resolving infrastructure component failures, and the like. In some cases, the activities that a cloud operator is authorized to perform may depend in part on the type of access (e.g., permissions) that the cloud operator has. For example, cloud operators with non-privileged (e.g., general) access can access an infrastructure component, such as a cloud computing instance (or virtual server instance), to perform general activities, such as maintenance, log retrieval, apply software patches, and the like.

In other examples, cloud operators with privileged access can access a root (or administrator) account in order to add software, remove software, modify user accounts/permissions, etc.

In some cases, e.g., for privileged access management, a cloud computing user can employ a system that maintains and distributes credentials among different cloud operators as a means of providing access control (e.g., authentication and authorization) to the user's infrastructure components in the cloud environment. In such a system, the credential (e.g., root password) that is used to gain access to the user's infrastructure components is stored in a password vault and is distributed (e.g., checked-out) to a cloud operator when the cloud operator needs to gain access to the infrastructure components. In other cases, e.g., for non-privileged access management, a cloud computing user can configure various accounts (with different levels of permissions) as a means of providing access control to the user's infrastructure components in the cloud environment. In one reference example, the cloud computing user can establish an operator account (or role), which has permission or authorization to access the user's infrastructure components. In this access control technique, any cloud operator that logs into the operator account (or has the operator role) can connect to the user's infrastructure components to perform various activities.

One issue with these conventional access control techniques is that they provide cloud operators with the persistent ability to connect to infrastructure components in a cloud environment. That is, a given cloud operator can use their credentials to always gain access to the infrastructure components, regardless of the circumstances. Such access control techniques, therefore, are not capable of adapting the access that is granted to a cloud operator based on the current operating conditions and surrounding events. In addition, providing cloud operators with persistent access to infrastructure components in this manner can increase the security risk to the infrastructure components. In particular, these broad persistent access patterns can be exploited by malicious actors to attack and compromise the infrastructure components. For example, with persistent access to infrastructure components, a malicious actor can connect to a large number (e.g., thousands) of infrastructure components and crash all of the infrastructure components simultaneously. In another example, with persistent access, a malicious actor can connect to several different systems in the cloud computing environment within a relatively short amount of time (e.g., on the order of milliseconds) to cause a system failure.

To address such issues, embodiments herein describe improved techniques for managing a cloud operator's access (or connection) to a user's infrastructure components (e.g., virtual server instances, relational database instances, virtual network devices, etc.) hosted in a cloud computing environment. In particular, embodiments provide an access broker that acts as a control point for providing non-persistent, adaptive, and event-based operator access to a single infrastructure component (e.g., as opposed to persistent access to multiple (or all) of a user's infrastructure components).

In one embodiment, a cloud operator may not possess the persistent ability to access a user's infrastructure components hosted in a cloud computing environment. That is, the cloud operator may be without a set of identity access and management (IAM) permissions that allow the cloud operator to connect to any infrastructure component using IAM authentication. When the cloud operator wants to connect to a particular infrastructure component, the cloud operator can issue an authenticated application programming interface (API) call to the access broker, passing the identifier (or identity) (ID) of the infrastructure component (e.g., instance) they want to connect to and the username they wish to connect as.

The access broker can check the pre-authorization of the cloud operator to connect to the requested infrastructure component (e.g., instance ID) as the requested user. That is, the access broker can determine whether the requested infrastructure component is a resource that the cloud operator should be able to connect to. In one embodiment, the pre-authorization of the cloud operator can be based on an explicit set of permissions (associated with the cloud operator) maintained in another system (e.g., data store), such as an active directory (AD)/lightweight directory access protocol (LDAP) server. In this case, the access broker can determine whether access to the requested resource is within an explicit list of permissions associated with the cloud operator in the system. Additionally, or alternatively, in another embodiment, the pre-authorization of the cloud operator can be based on attributes that map user identity attributes to tags or other infrastructure component characteristics.

In addition to checking the pre-authorization of the cloud operator to connect to the requested infrastructure component, the access broker can issue notifications, seek real-time approvals (e.g., from another user), determine a user context (e.g., the rate or number of requests received from the cloud operator within a predefined time period, whether there have been similar requests from the same cloud operator, a configuration of a device used to request access, a location of the cloud operator and/or cloud operator device, etc.), and determine a current state of the cloud computing environment (e.g., is there an outage, is it a scheduled time for maintenance, etc.). The access broker can use the user context and current state of the cloud computing environment to determine an overall context of the surrounding events, e.g., at a time that the request to access the infrastructure component is received. The access broker then makes a final authorization decision of whether to grant the cloud operator access to the requested infrastructure component, based on the overall context of the surrounding events (e.g., as opposed to making an authorization decision based solely on persistent permissions associated with the cloud operator).

In some embodiments, the access broker can implement a human-based approval mechanism before granting the cloud operator access to the requested infrastructure component. For example, the access broker can enforce two-person rule, a "fail-open" safeguard (e.g., an amount of time in which the authorization can be overridden and halted), a "fail-close" safeguard (e.g., human-based approval is needed before access can be granted), etc., before granting the cloud operator access to the requested infrastructure component. In the case of a "fail-open" safeguard, for example, the access broker can send a notification of an access attempt to another person for human-based approval. Upon receiving the notification, the person may have a window of time to override and stop the authorization. If the person does not respond within the window of time or the person does consent, the access broker can grant the cloud operator access to the requested infrastructure component.

Assuming the access broker determines to grant authorization, the access broker can retrieve a time bound access credential (e.g., access token) that is scoped to the exact infrastructure component (or resource) (e.g., instance ID) that the cloud operator requested access (or a connection) to, and deliver the credential to the cloud operator. The cloud operator can then initiate an IAM-authenticated connection to the resource using the provided credential (e.g., as opposed to using their normal IAM-based credentials, which do not have access to the infrastructure component). By using the access broker to provide a credential that is only able to connect to the single infrastructure component (e.g., instance ID) as opposed to all of the infrastructure components (or resources) that the cloud operator may have permission or pre-authorization to access, embodiments can avoid the broad persistent access patterns associated with traditional access control techniques that are commonly exploited by malicious actors. In addition, by using the access broker to issue notifications, seek real-time approvals, and make authorization decisions based on surrounding events, embodiments can allow for adaptive and event-based cloud operator access to resources in a cloud environment (e.g., as opposed to an access control technique based solely on persistent permissions associated with the cloud operator).

As used herein, an application may refer to a software application, an API implementation, a module, etc. As used herein, an infrastructure component may refer to a resource hosted in a cloud computing environment, such as a cloud computing instance (also referred to as a virtual server instance), a database instance (also referred to as a relational database engine instance), a virtual network device, etc. Additionally, while many of the following embodiments use virtual server instances and database instances as reference examples of resources that may be located in a cloud computing environment and that a cloud operator may attempt to access, the techniques presented herein can be used to access any type of resource (e.g., data, applications, servers, operating systems, etc.) (hosted) in a cloud computing environment. Similarly, while many of the following embodiments use an IaaS as a reference example of a cloud computing environment, the techniques presented herein can be used for other types of cloud computing environments, such as Platform-as-a-Service (PaaS) cloud computing environments, Software-as-a-Service (SaaS) cloud computing environments, Desktop-as-a-Service (DaaS) cloud computing environments, Disaster recovery-as-a-Service (DRaaS) cloud computing environments, and so on.

FIG. 1 illustrates an example network architecture for managing operator access to a cloud computing environment 102, according to one embodiment. The operator may be a privileged operator or a non-privileged operator. The cloud computing environment 102 may host multiple services used for providing access control (e.g., authentication and authorization) to resources in the cloud computing environment 102. In this example, the cloud computing environment 102 includes an authentication service 120, a token service 130, a management server 150, and infrastructure components 104. The cloud computing environment 102 generally represents an IaaS provider setting that offers IaaS services to a cloud computing user (e.g., an enterprise, individual, small organization, etc.).

The authentication service 120 provides identity and access management (IAM) for the cloud computing environment 102. That is, the authentication service 120 can control who is authenticated (e.g., signed in) and pre-authorized (e.g., has permissions) to use various services in the cloud computing environment 102. The authentication service 120 can implement one or more standardized authentication protocols (e.g., OpenID connect, Security Assertion Markup Language (SAML), etc.) in order to authenticate a user attempting to connect to the cloud computing environment 102. As described further below, the authentication service 120 can implement authentication and authorization via an identity provider (IDP). Note that while FIG. 1 depicts the authentication service 120 within the cloud computing environment 102, in other embodiments, one or more components of the authentication service 120 may be located elsewhere (e.g., in another network).

The authentication service 120 may enable a cloud computing user (or customer) to define entities (e.g., users, groups of users, or roles) and permissions (also referred to as a policy or attributes) that can be attached to the entities. The permissions (or policies) define the pre-authorizations in terms of what is allowed to be done (by an entity) in the cloud computing environment 102. In one example, the cloud computing user can define an operator role and define a set of permissions (policy) that allow for accessing the infrastructure components 104. In this case, the policy may allow for accessing a type of infrastructure components 104 (e.g., virtual server instances), e.g., to perform maintenance or apply software updates on the virtual server instances. In this example, the policy can be attached to the operator role, such that a cloud operator (e.g., user 100) that has the operator role has the associated set of permissions. In another example, the policy can be attached directly to a username associated with the cloud operator (e.g., user 100) or a user group of cloud operators (e.g., a group of users 100).

The token service 130 enables a cloud computing user to provide access credentials to users (e.g., user 100) that are authenticated via the authentication service 120. In one embodiment, the access credential provided by the token service 130 to the user 100 may be a temporary (e.g., timebound or time-limited), limited privilege credential. That is, the access credential may allow the user 100 to access (or connect to) a particular infrastructure component (e.g., infrastructure component 104-1) for a limited amount of time (e.g., a predefined amount of time, on the order of minutes), as opposed to all of the infrastructure components 104 at any time for any duration of time.

The management server 150 enables a cloud computing user (and/or a cloud operator associated with the cloud computing user) to access (connect to), manage, and control their infrastructure components 104 hosted in the cloud computing environment 102. For example, the management server 150 can allow the cloud computing user to apply patches, updates, and configuration changes to one or more of the infrastructure components 104. In some cases, the management server 150 can allow the cloud computing user to start infrastructure components 104, stop infrastructure components 104, re-start infrastructure components 104. The management server 150 can enable the cloud computing user to view system configurations, application configurations, and other information about the cloud computing user's infrastructure components 104 hosted in the cloud computing environment 102.

In this embodiment, the infrastructure components 104 can include virtual server instances, database instances, virtual network devices, etc. Although not shown, the infrastructure components 104 may be hosted on one or more physical computing systems (e.g., servers, databases, etc.) in the cloud computing environment 102. In the case where an infrastructure component 104 is a virtual server instance, the infrastructure component 104 can run an operating system in order to execute an application provided by the cloud computing user. In general, the virtual server instance may provide the operating system with a set of virtualized computing hardware necessary to run an application. In the case where an infrastructure component 104 is a database instance, the infrastructure component 104 may be an isolated/standalone database environment. The database instance may run a database engine, examples of which include MySQL, MariaDB, PostgreSQL, etc.

As noted, in some cases, a cloud computing user (or customer) may have to grant one or more individuals (e.g., cloud operators, such as user 100) access to their infrastructure components 104 that are hosted in the cloud computing environment 102. For example, the cloud operators may be responsible for performing maintenance on the infrastructure components 104, applying software updates on the infrastructure components 104, retrieving logs from the infrastructure components 104, and the like. In conventional systems, the cloud computing user could grant a particular cloud operator access to their infrastructure components 104 by attaching a set of permissions (e.g., a policy) to the cloud operator (e.g., the cloud operator's identity or role associated with the cloud operator's identity). However, as noted, this means of providing of access control grants the cloud operator persistent access to the cloud computing user's infrastructure components 104, increasing the security risk to the infrastructure components 104. For example, the cloud operator can always access the infrastructure components 104, as long as the cloud operator is authenticated and has a policy that allows the cloud operator to access the infrastructure components 104.

To address this issue, embodiments presented herein use the access broker 110 and validation tool 140 to provide a cloud operator with non-persistent access to the infrastructure components 104 hosted in the cloud computing environment 102. As shown, the access broker 110 and the validation tool 140 are deployed in the cloud computing environment 102. The access broker 110 can be a software component executing on one or more computing systems (not shown) in the cloud computing environment 102. In one embodiment, the access broker 110 provides (or acts as) a checkpoint in the non-persistent access control mechanism, where the access broker 110 can make an authorization decision based on an overall context of the current surrounding environment. The access broker 110 can interact with the authentication service 120, the token service 130, the validation tool 140, and/or the infrastructure components 104 (e.g., via the management server 150) in order to provide a cloud operator (e.g., user 100) access to one or more infrastructure components 104.

In this embodiment, the user 100 may be a cloud operator that is responsible for managing and maintaining various aspects of the cloud computing environment 102. For example, the user 100 may be responsible for managing and maintaining one or more infrastructure components 104 in the cloud computing environment 102. In this case, the user 100 does not have persistent access to the infrastructure components 104 in the cloud computing environment 102. That is, the set of permissions (or policy) associated with the user 100 does not allow the user 100 to connect to the infrastructure components 104.

The access broker 110 includes an access component 112, which is a software application. In one embodiment, the access component 112 represents the back-end of a software application (e.g., access broker 110) that provides access control (e.g., authentication and authorization) to infrastructure components 104. In one embodiment, the access component 112 can use an environmental state 114 and user context 116 to determine an overall context of the surrounding events when determining whether to grant a user 100 access to a given infrastructure component 104 (e.g., infrastructure component 104-1). The environmental state 114, in particular, includes information regarding a current operating state of the cloud computing environment, including the infrastructure components 104. For example, the environmental state 114 can indicate whether there is an outage, whether an infrastructure component 104 has crashed, whether a underlying physical system for one of the infrastructure components 104 has crashed, whether resources (e.g., CPU, memory, disk space, etc.) of a given physical system available to an infrastructure component 104 has reached a threshold, the number of error messages received for a given infrastructure component 104, whether maintenance is needed for an infrastructure component 104, and the like. In general, with the environmental state 114, the access broker 110 can determine whether there is a reason or justification for the user 100 submitting a request to access a given infrastructure component 104. For example, if the user 100 is attempting to access infrastructure component 104-1 for maintenance, the access broker 110 can determine, from the environmental state 114, whether there is a need for maintenance for infrastructure component 104-1 (e.g., a time for scheduled maintenance has occurred or approaching).

The user context 116 includes information associated with the cloud operator's current and previous requests. For example, the user context 116 can indicate the number of requests received from the cloud operator, the rate of requests received from the cloud operator, whether the requested infrastructure component has previously been accessed (and, if so, the number of times the requested infrastructure component has been accessed) by the cloud operator, a number of access credentials (e.g., access tokens) previously issued to the cloud operator, a rate in which the access credentials have been previously issued to the cloud operator, an average time duration (e.g., time-to-live) of access credentials previously issued to the cloud operator, a geographical location of the cloud operator, a configuration of a device used by the cloud operator (e.g., whether the device is a sanctioned device or unsanctioned device, a geographical location of the device, etc.), an authentication method used to authenticate the cloud operator, and the like.

In one embodiment, after authenticating the user 100 via the authentication service 120, the access broker 110 may receive an authenticated request from the user 100 to access (or connect to) a particular infrastructure component (e.g., infrastructure component 104-1). Upon receipt, the access broker 110 can determine the current environmental state 114 and the user context 116, and make an authorization decision of whether to grant the user 100 access to the infrastructure component 104-1, based on the current environmental state 114 and the user context 116. In addition, in some embodiments, the access broker 110 can send a notification of the user's access attempt to another user for human-based approval of the access attempt. In this case, the access broker 110 can implement two person rule, a "fail-open" safeguard, a "fail-close" safeguard, etc. Further, in some embodiments, the access broker 110 can employ the validation tool 140 to determine (in real-time) whether to implement one or more additional access conditions 142 (e.g., a time-out period) prior to granting the user 100 access to the infrastructure component 104-1.

Assuming the access broker 110 decides to grant the user access to the infrastructure component 104-1 and determines that the access conditions 142 have been satisfied (or determines that there are no access conditions 142), the access broker 110 can interact with the token service 130 to retrieve a time-bound access credential specifically scoped to the infrastructure component 104-1. The access broker 110 returns the access credential to the user 100, which uses the access credential to access the specific infrastructure component 104-1 via the management server 150. In this manner, the access broker 110 can provide an access control (e.g., authentication and authorization) mechanism for (privileged and non-privileged) cloud operators that is non-persistent, event-driven, and adaptable to changing circumstances in the cloud computing environment 102.

Figure 2:
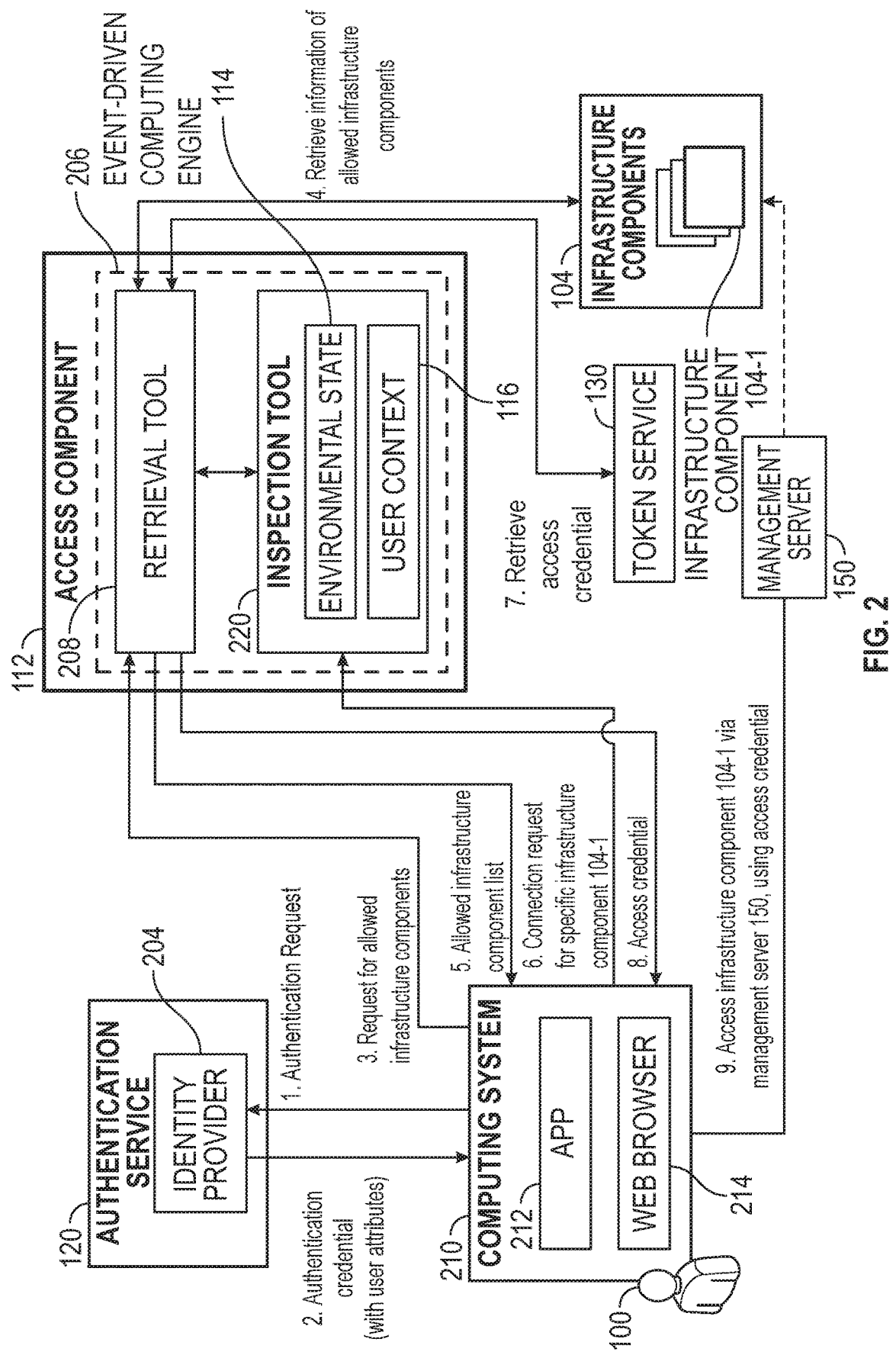
FIG. 2 illustrates an example deployment of components of the network architecture, described relative to FIG. 1, according to one embodiment.

FIG. 2 further illustrates components of the network architecture, described relative to FIG. 1, according to one embodiment. In this embodiment, the user 100 may interact with the cloud computing environment 102 via the computing system 210. The computing system 210 is representative of a variety of computing devices (systems) including, for example, a desktop computer, a laptop computer, a mobile computer (e.g., a tablet or a smartphone), etc. Although not shown, the computing system 210 may connect to the cloud computing environment 102 via another network (e.g., the Internet).

The computing system 210 is generally configured to host applications used to access the cloud computing environment 102. Here, the computing system 210 includes an application (also referred to as an app) 212 and a web browser 214. The application 212 is representative of a component of a client server application (or other distributed application) which can communicate with the cloud computing environment 102. Application 212 may be a "thin" client where the processing is largely directed by the application 212, but performed by computing systems (e.g., access broker 110) of the cloud computing environment 102 or a conventional software application installed on the computing system 210. The web browser 214 can also be used to access the cloud computing environment 102. In one embodiment, the application 212 and/or the web browser 214 can implement the front-end processes of the access component 112 within the access broker 110.

The user 100 may attempt to access the access component 112 in the cloud computing environment via the application 212 or the web browser 214. For example, the user may provide credentials (e.g., username/password) at the front-end of the access component 112 (e.g., via the application 212 or web browser 214) in order to log into the access component 112. Once the user 100 provides their credentials, the application 212 or web browser 214 submits an authentication request to the authentication service 120, e.g., in order to authenticate the user 100 (step 1).

The authentication service 120 includes an identity provider 204. The identity provider 204 can implement a variety of authentication protocols, such as OpenID connect, SAML, etc. The identity provider 204 can be a local identity provider (e.g., associated with the cloud computing user) and/or a third party identity provider. The authentication service 120 may enable a cloud operator to sign in via the identity provider 204. The identity provider 204 can authenticate the identity of the user 100 based on information (e.g., a client ID) supplied in the authentication request and retrieve one or more attributes of the user 100. The user attributes can indicate the set of permissions (or policy) associated with the user 100, a role of the user 100, an identity (or username) of the user 100, a user group associated with the user 100, etc. Assuming authentication is successful, the authentication service 120 returns to the computing system 210 an authentication credential (e.g., an authentication token) that includes the user attributes (step 2). In one embodiment, the policy within the user attributes may indicate the roles and/or permissions associated with the user 100. For example, the policy can specify what types of infrastructure components 104 the user 100 is allowed to manage. In another example, the policy can specify that the user 100 is allowed to perform maintenance on a certain type of infrastructure components 104.

At step 3, the computing system 210 submits a request for the allowed infrastructure components 104 to the retrieval tool 208 of the access component 112. The request may include the authentication credential along with the user attributes (e.g., embedded within the authentication credential) received from the authentication service in step 2. In one embodiment, the request may be sent using a Representational State Transfer (REST) API method. For example, the computing system 210 can send an API method request (or HyperText Transfer Protocol (HTTP) request) "GET /myinstances" to the access component 112.

As shown, the access component 112 includes a retrieval tool 208 and an inspection tool 220, which are software components/modules. In one embodiment, the access component 112 may execute the retrieval tool 208 and/or the inspection tool 220 via an event-driven computing engine 206. The event-driven computing engine 206 is generally configured to invoke one or more functions to execute the operations of the retrieval tool 208 and/or the inspection tool 220. For example, the event-driven computing engine 206 may execute the retrieval tool 208 upon detecting the request for the allowed infrastructure components (e.g., at step 3). The API method request triggers the retrieval tool 208 to access the infrastructure components 104 (e.g., via the management server 150) in order to determine which subset of the infrastructure components 104 hosted in the cloud computing environment 102 the user 100 is pre-authorized to access (e.g., based on the attributes received in step 3) (step 4). In one embodiment, at step 4, the retrieval tool 208 can retrieve the infrastructure component information (e.g., infrastructure component IDs) of the subset of infrastructure components 104 that the user 100 is pre-authorized to access from the management server 150 using an API call. Once the infrastructure component information is received, the retrieval tool 208 returns the infrastructure component information to the computing system 210, e.g., using an API method response (or HTTP response) (step 5).

The computing system 210 can display the allowed infrastructure components list to the user 100 and prompt the user 100 to select one of the infrastructure components 104 to connect to. In one embodiment, the allowed infrastructure components list may include a list of the subset of infrastructure component IDs that the user 100 is allowed (or pre-authorized) to connect to. Here, the computing system 210 sends a connection request (or request to access) for infrastructure component 104-1 (step 6), based on the user 100's selection of infrastructure component 104-1. The connection request may include the authentication credential (along with the encoded attributes) received from the authentication service 120. In one embodiment, the connection request may be sent using another REST API method. For example, the computing system can send another API method request "GET /accesstoken/infrastructurecomponent104-1" to the access component 112.

In this case, the connection request is sent to and detected by the inspection tool 220 of the access component 112. The connection request triggers the event-driven computing engine 206 to execute inspection tool 220. In particular, the inspection tool 220 is configured to determine a current environmental state 114 and a user context 116. As noted, the current environmental state 114 includes information regarding the operating state of the cloud computing environment (e.g., outage information, resource levels of the infrastructure components and/or underlying physical systems, number of error messages, etc.) and the user context 116 includes information regarding the user's current and previous interaction with the access component 112 (e.g., number/rate of requests from the user 100, number/rate of access credentials issued to the user 100, average time-to-live of access credentials issued to user 100, whether the user has previously accessed the requested instance, context information about the user's device, location, authentication method, etc.). In one embodiment, the inspection tool 220 can interact with the management server 150 to determine the current environmental state 114. For example, the inspection tool 220 can obtain, via the management server 150, a configuration of a computing system hosting the infrastructure component 104-1, and determine the current environmental state 114, based in part on the configuration. Similarly, in one embodiment, the inspection tool 220 can retrieve at least some of the user context information from the attributes encoded into the authentication credential that is passed (e.g., as a header) of the connection request and/or from a storage location (e.g., database) (not shown) in the cloud computing environment 102.

The inspection tool 220 can make an authorization decision based on the environmental state 114 and the user context 116. For example, as described further below, the inspection tool 220 may determine to grant the user 100 access to the infrastructure component 104-1 if the environmental state 114 and the user context 116 satisfy one or more predetermined criteria. In one embodiment, the criteria can based on one or more rules from the cloud computing user (or customer). The inspection tool 220 sends the authorization decision to the retrieval tool 208.

Although not shown in FIG. 2, if the authorization decision is to deny access, the retrieval tool 208 can return a deny (or denial) message to the computing system 210 in response to the connection request for the infrastructure component 104-1. On the other hand, if the authorization decision is to grant access, the retrieval tool 208 can retrieve an access credential to access the infrastructure component 104-1 from the token service 130, e.g., using an API request call (step 7). As noted, the access credential that is received from the token service 130 is a time-bound access credential that is specifically scoped to the infrastructure component 104-1. The retrieval tool 208 can return the access credential to the computing system 210 (step 8). Once the access credential is received, the user 100 can make an API call to the management server 150, using the access credential, the result of which is a connection to the specific infrastructure component 104-1 (step 9).

Figure 3:
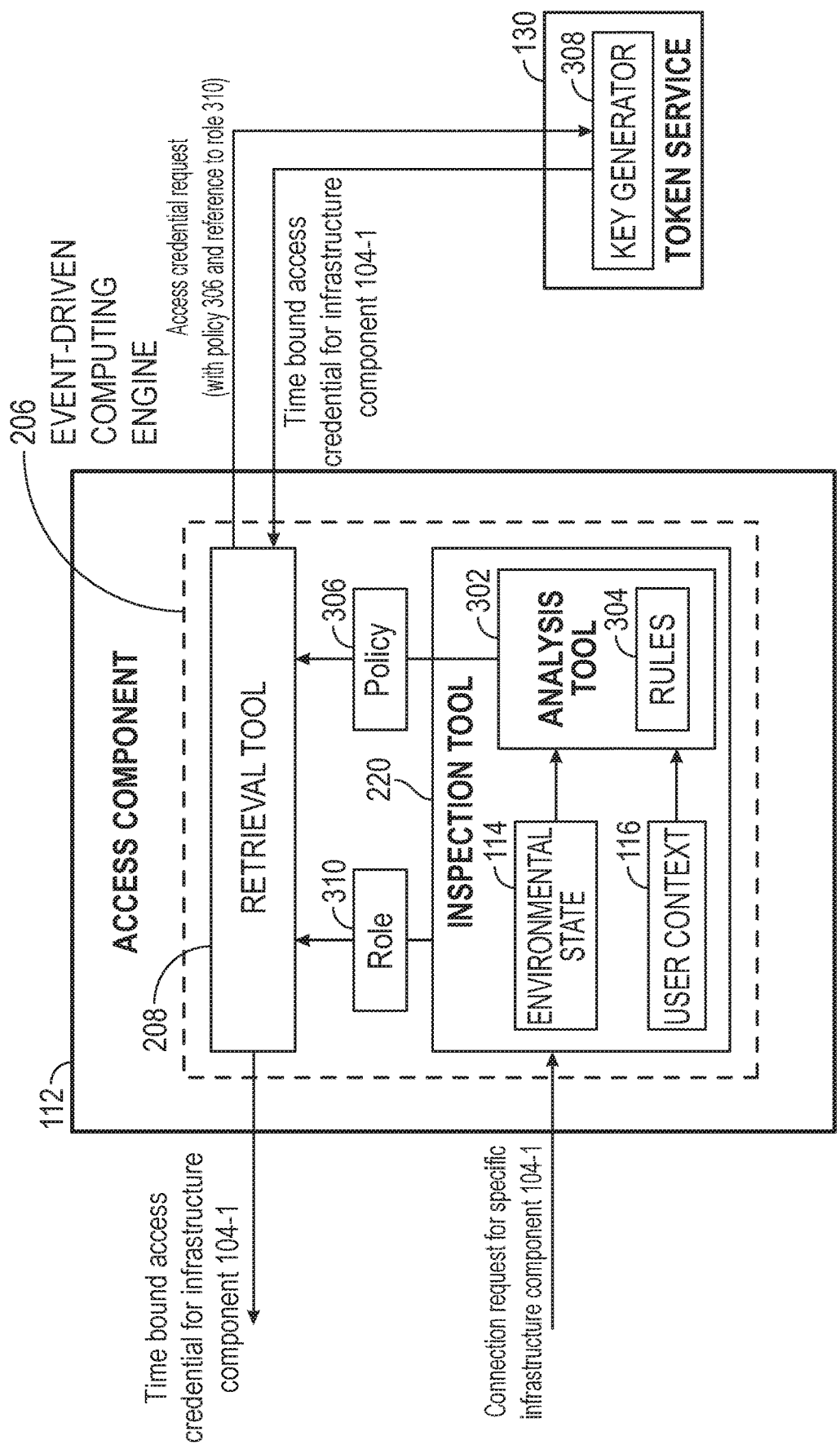
FIG. 3 illustrates an example access component, according to one embodiment.

FIG. 3 further illustrates the access component 112, described relative to FIG. 2, according to one embodiment. Here, once the access component 112 receives the connection request for the specific infrastructure component 104-1, the event-driven computing engine 206 triggers the inspection tool 220 to determine the environmental state 114 and the user context 116. As shown, the inspection tool 220 includes an analysis tool 302, which analyzes the environmental state 114 and the user context 116 according to rules 304. In one embodiment, the rules 304 may implement business logic of the cloud computing user. For example, the cloud computing user can define the rules 304 for authorization decisions, based on a tradeoff between the amount of access it wants to provide to cloud operators and an amount of risk it is willing to accept due to such access. In one reference example, the rules 304 may specify that access to a given infrastructure component (e.g., infrastructure component 104-1) should not be granted unless resources (e.g., CPU, memory, disk space) of the underlying physical system has reached a critical fault (e.g., the amount of resources is less than a threshold amount of resources). In another reference example, the rules 304 may specify that access to a given infrastructure component (e.g., infrastructure component 104-1) should not be granted unless an application running on the infrastructure component has received a threshold number of error messages in a predefined period of time (e.g., previous X minutes). In yet another reference example, the rules 304 may specify that access to a given infrastructure component should be granted unless the user has requested access to large number of infrastructure components (e.g., above a threshold) in a predefined amount of time. In yet another example, the rules 304 may specify that access to a given infrastructure component should not be granted unless the infrastructure component has experienced a failure or a scheduled time for maintenance has occurred.

In one embodiment, the analysis tool 302 can generate a policy 306 based on its analysis of the environmental state 114 and the user context 116, and send the policy 306 to the retrieval tool 208. The policy 306 is a dynamic scoping policy that defines a limited set of permissions for the user 100. For example, the policy 306 can specify that the user 100 is allowed (or authorized) to only connect to the infrastructure component 104-1 and/or the amount of time in which the user is allowed to maintain a connection to the infrastructure component 104-1. The inspection tool 220 also provides an indication of the role 310 of the user 100 to the retrieval tool 208. The role 310 can be determined from the attributes embedded in the authentication credential that is passed as part of the connection request for the infrastructure component 104-1. Attached to the role 310 is an indication of the (initial) set of permissions (or policies) received from the authentication service 120.

Once the retrieval tool 208 receives the policy 306 and the role 310, the retrieval tool 208 sends a request for an access credential (e.g., using an API request call) to the token service 130, and includes in the request the policy 306 and a reference to (or indication of) the role 310, which is associated with the initial set of permissions received from the authentication service 120. The token service 130 includes a key generator 308, which generates a time bound access credential for the infrastructure component 104-1, based on the policy 306 and the initial set of permissions (determined from the reference to the role 310). For example, in one embodiment, the key generator 308 can generate an access credential with permissions that represent the intersection between the initial set of permissions and the policy 306. Once generated, the token service 130 returns the access credential to the retrieval tool 208. The retrieval tool 208 then provides the access credential to the user 100, in response to the connection request for the specific infrastructure component 104-1.

Figure 4:
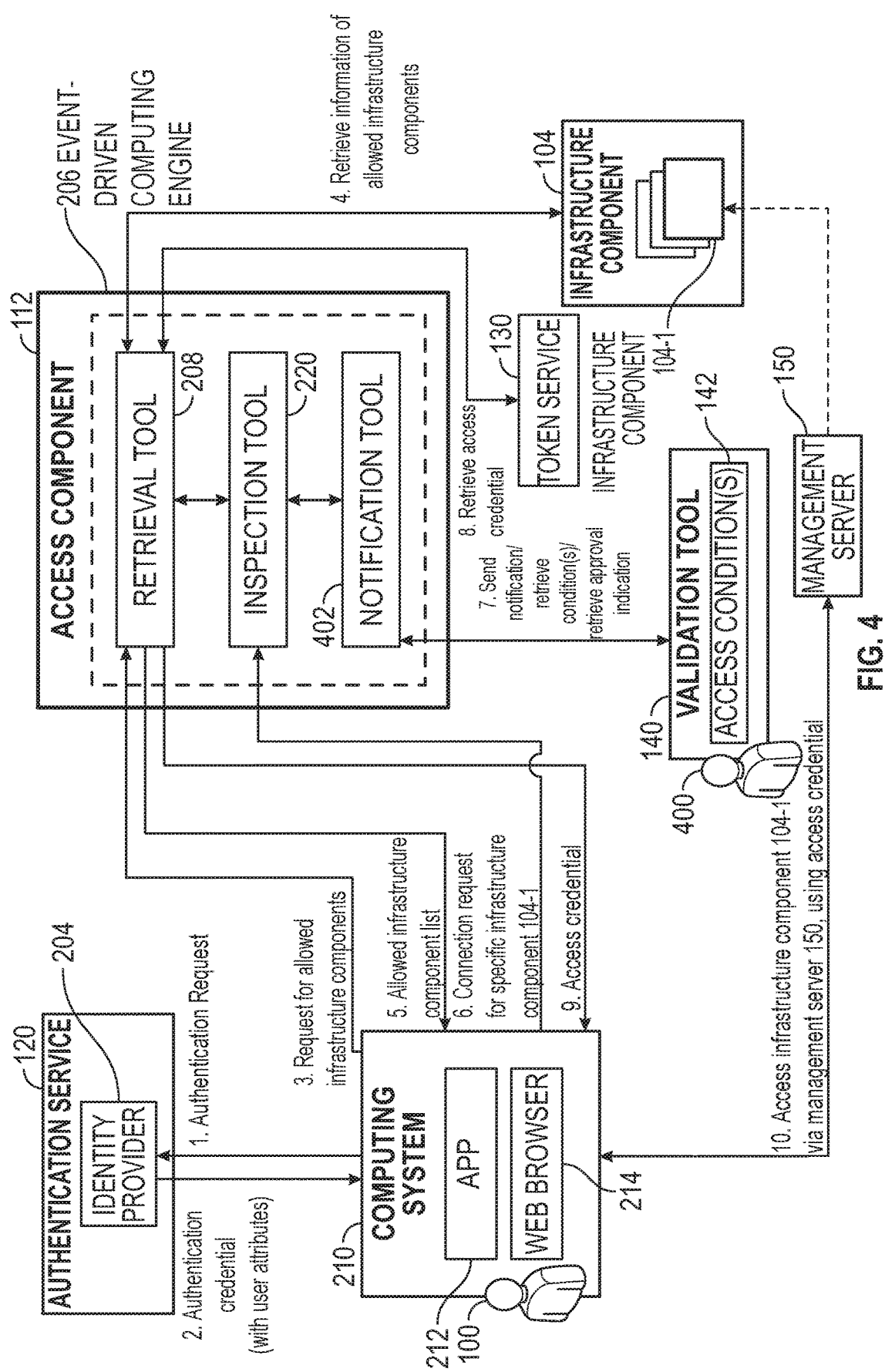
FIG. 4 illustrates another example deployment of components of the network architecture, described relative to FIG. 1, according to one embodiment.

FIG. 4 further illustrates components of the network architecture, described relative to FIG. 1, according to one embodiment. Compared to FIG. 2, in this embodiment, the access component 112 further includes a notification tool 402 (e.g., a software component), which interacts with the validation tool 140. For example, upon receiving the connection request for the specific infrastructure component 104-1 (step 6), the inspection tool 220 triggers the notification tool 402 (e.g., via the event-driven computing engine 206) to send a real-time notification of the connection request (or access attempt) to the validation tool 140 and/or the user 400 (step 7).

In one embodiment, the access component 112 may implement one or more human-based safeguards, before granting the user 100 access to the infrastructure component 104-1. In one example, the notification tool 402 may transmit the notification of the connection request to the user 400. After transmission, the access component 112 may be configured to refrain from taking any further action (e.g., issuing an access credential), until the user 400 provides an explicit approval (or consent) to the connection request (e.g., "fail-close" human-based safeguard). If the user 400 does not provide explicit approval to the connection request, the access component 112 refrains from retrieving an access credential for the infrastructure component 104-1. In another example, upon receiving the notification of the connection request, the user 400 may be given a predefined amount of time, during which the user 400 can override and halt authorization by the access component 112 (e.g., "fail-open" human-based safeguard). If the user 400 does not respond within the predefined amount of time (e.g., with an approval indication) or the user 400 consents to the connection request, the access component 112 can proceed to grant the user access to the infrastructure component 104-1 (e.g., by retrieving the access credential from the token service 130). Note, that while both of these examples use human-based approval from a single user 400 as a pre-condition for authorizing the connection request, in some embodiments, the access component 112 can require human-based approval from multiple users 400 (or persons). For example, both the "fail-open" and "fail-close" safeguards can be implemented with two-person rule or multiple-person rule.

In another embodiment, as opposed to automatically requiring human-based approval as a pre-condition for authorizing the connection request, the notification can be analyzed in real-time by the user 400 and/or the validation tool 140. The validation tool 140 and/or the user 400 can determine, based on the analysis, whether to provide one or more access conditions 142 to the access component 112. That is, the notification may trigger the validation tool 140 and/or the user 400 to transmit one or more access conditions 142 to the access component 112 (step 7). For example, if the validation tool 140 and/or the user 400 determines that the user 100 is attempting to connect to the same infrastructure component (or to another infrastructure component) within a predefined period of time since a last connection attempt, the validation tool 140 may implement a time-out period as one of the access conditions 142. The time-out period may be an amount of time the access component 112 has to wait before retrieving and issuing an access token to the user 100. In another example, if the validation tool 140 and/or user 400 determines that the user 100 is attempting to connect to a high priority infrastructure component (e.g., running a critical application), the validation tool 140 can specify that another level of access control, such as two-person rule, be implemented before the access component 112 issues an access credential to the user 100.

Once any access condition(s) 142 have been implemented and/or human-based approval received, the notification tool 402 triggers the retrieval tool 208 to retrieve an access credential from the token service 130 (step 8). In step 9, the access credential is returned to the computing system 210 and, in step 10, the user 100 accesses (or connects to) the infrastructure component 104-1 via the management server 150, using the provided access credential.

Figure 5:
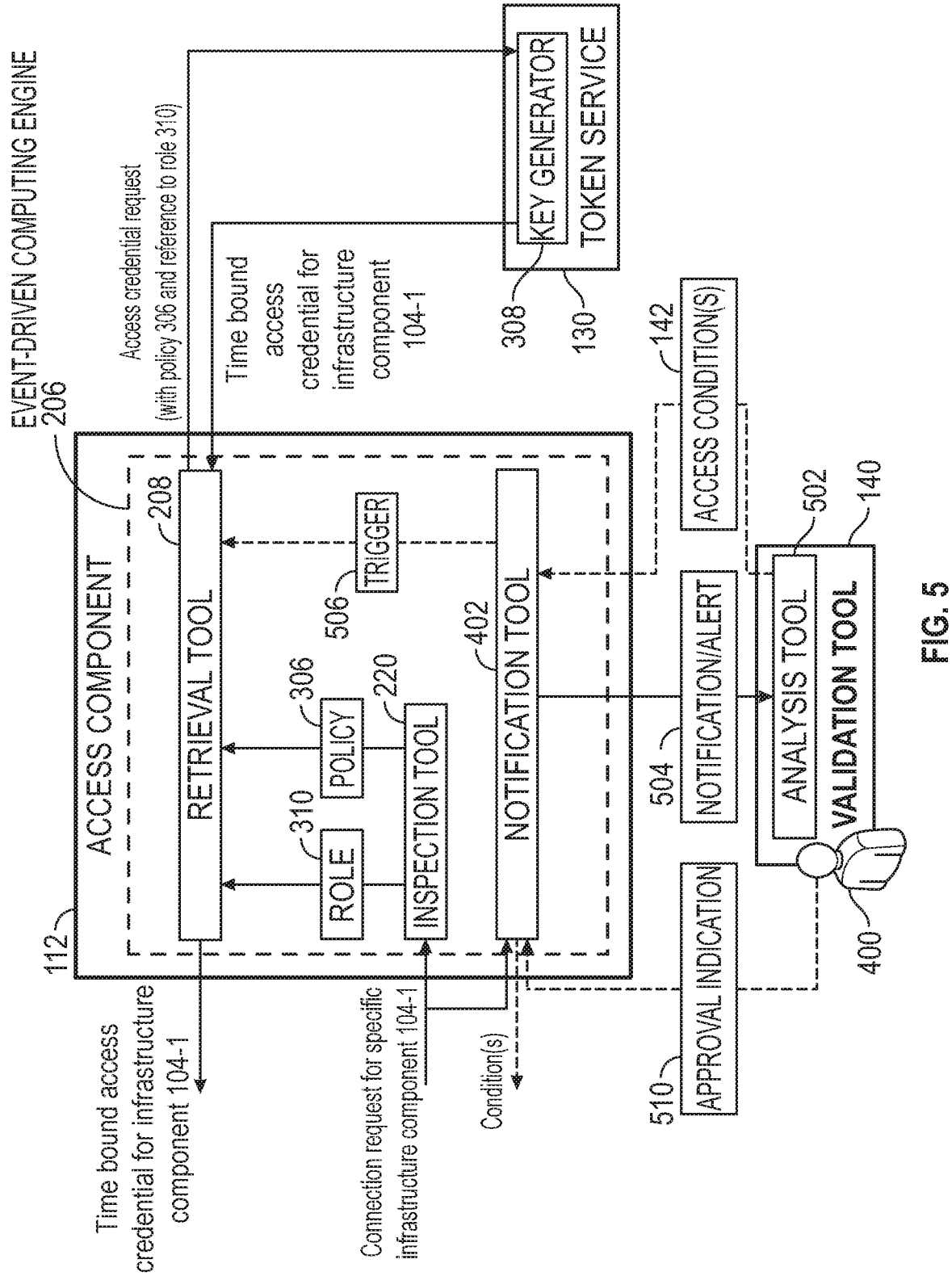
FIG. 5 illustrates another example access component, according to one embodiment.

FIG. 5 further illustrates the access component 112, described relative to FIG. 4, according to one embodiment. Compared to FIG. 3, in this embodiment, once the access component 112 receives the connection request for the specific infrastructure component 104-1, the event-driven computing engine 206 triggers the notification tool 402 to generate and send a notification/alert 504 to the validation tool 140 and/or the user 400. The notification/alert 504 may include an indication of the connection request (or access attempt) along with the contextual information (e.g., environmental state 114 and/or user context 116).

The validation tool 140 includes an analysis tool 502, which analyzes the notification/alert 504 to determine one or more access conditions 142. In one embodiment, the analysis tool 502 can analyze the notification/alert 504 using one or more predefined rules (e.g., specified by the cloud computing user) and/or using machine learning. The validation tool 140 sends the access condition(s) 142 to the notification tool 402, which can forward the condition(s) to the user 100. Once the notification tool 402 determines that the access condition(s) 142 have been implemented, the notification tool 402 sends a trigger 506 to the retrieval tool 208. This causes the retrieval tool 208 to retrieve the access credential from the token service 130 and to return the retrieved access credential to the user 100.

In another embodiment, as discussed above, upon receiving the notification 504, rather than analyzing the notification 504 in real-time, the user 400 (or multiple users 400) may have to explicitly provide human-based approval (or consent) (e.g., approval indication 510) to the connection request, before the notification tool 402 can send the trigger 506 to the retrieval tool 208. In yet another embodiment, if the user 400 (or multiple users 400) does not provide an approval indication 510 within a predefined amount of time (or does provide the approval indication 510 that indicates consent to the connection request), the notification tool 402 can send the trigger 506 to the retrieval tool 208.

Figure 6:
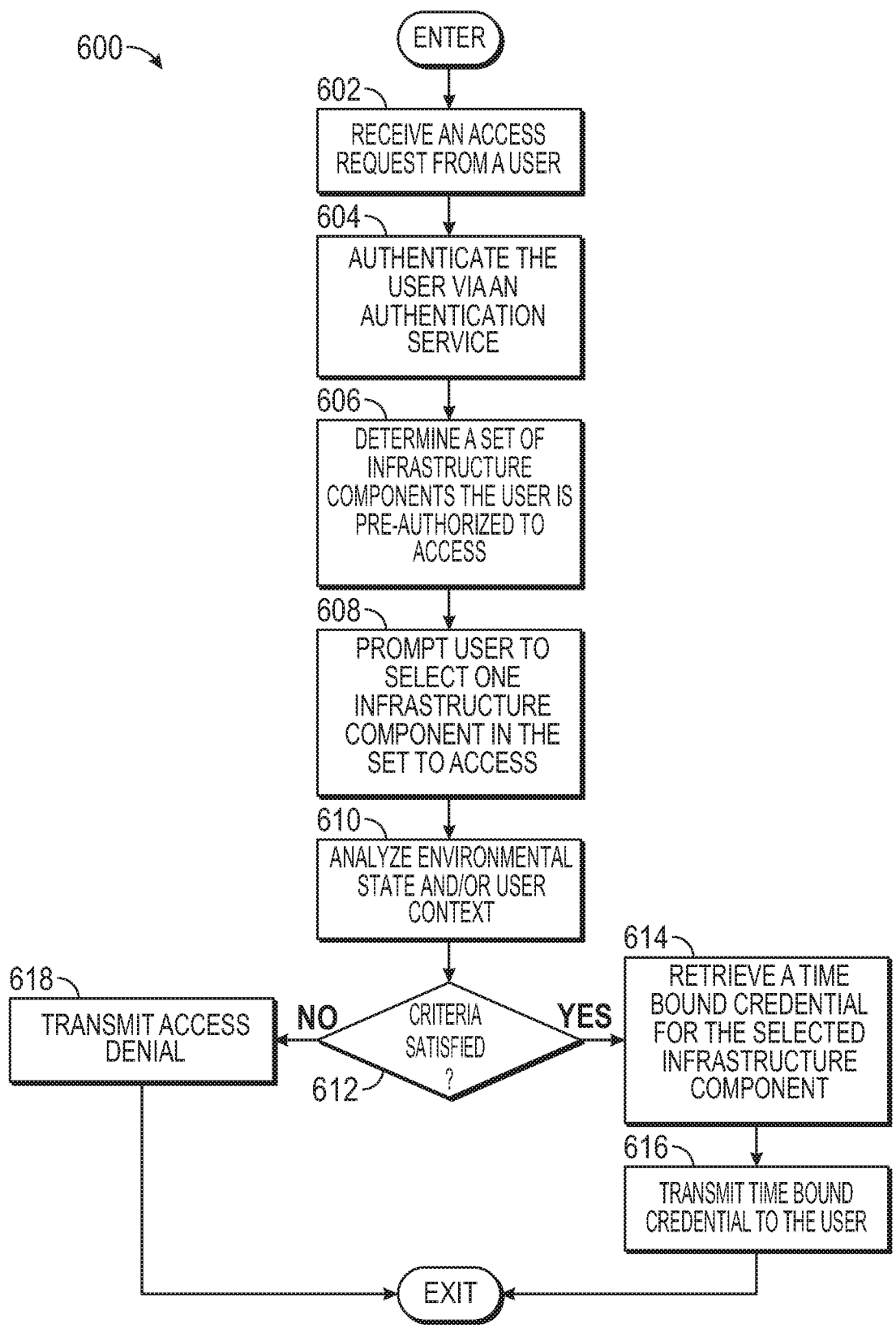
FIG. 6 is a flowchart of a method for managing non-persistent operator access to infrastructure components hosted in a cloud computing environment, according to one embodiment.

FIG. 6 is a flowchart of a method 600 for managing non-persistent operator access to resources (e.g., infrastructure components 104) hosted in a cloud computing environment 102, according to one embodiment. The method 600 may be performed by one or more components of the cloud computing environment 102. In one particular embodiment, the method 600 is performed by the front-end (e.g., application 212/web browser 214) and back-end (e.g., access component 112) of the access broker 110.

The method 600 may enter at block 602, where the access broker 110 receives an access request from a user (e.g., user 100). For example, the access request may be a login attempt by the user to access the cloud computing environment 102. The access request may be received at the front-end of the access broker 110 (e.g., application 212 or web browser 214). At block 604, the access broker 110 authenticates the user via an authentication service (e.g., authentication service 120). In one embodiment, at least one of the components of the authentication service may be hosted in the cloud computing environment 102. For example, the authentication service can include an identity provider (e.g., identity provider 204) that authenticates an identity of the user based on information provided in the access request and provides (returns) a set of user attributes.

At block 606, the access broker 110 determines a set of infrastructure components (e.g., a subset of the infrastructure components hosted in the cloud computing environment 102) the user is pre-authorized to access. That is, this set of infrastructure components may be the subset of infrastructure components that the user may potentially gain authorization to connect to in the cloud computing environment 102. In one embodiment, the access broker 110 can determine the set of infrastructure components the user is pre-authorized to access (but not necessarily authorized to access) based in part on the authentication.

In one example, as part of the authentication, the access broker 110 may receive (from the authentication service) an indication of a role (e.g., operator role) associated with the user. The role may be associated with a set of permissions (or policies) indicating what an identity (e.g., the user) that is assigned the role is pre-authorized to do. For example, the set of permissions associated with the role (e.g., operator role) may indicate that role is pre-authorized to access and manage a particular type of infrastructure components (e.g., virtual server instances).

In another example, as part of the authentication, the access broker 110 may receive (from the authentication service) attributes that include the set of permissions (or policies) indicating what the user is pre-authorized to do. Similarly, in this example, the set of permissions may indicate that the user is pre-authorized to access and manage a particular type of infrastructure components (e.g., database instances).

Based on the set of permissions provided by the authentication service, the access broker 110 can inspect (e.g., via a management server 150) a configuration of the infrastructure components hosted in the cloud computing environment 102 to determine a list of the subset of infrastructure components (out of all the infrastructure components hosted in the cloud computing environment 102) the user is pre-authorized to manage, based on the set of permissions. In some cases, at block 606, the access broker 110 may determine other contextual information about the user, including but not limited to, attributes, environment state, business systems, rules engine(s), etc.

At block 608, the access broker 110 prompts the user to select one infrastructure component in the set of infrastructure components to request access (or a connection) to. For example, at block 608, the front-end of the access broker 110 can send a connection request for the selected infrastructure component to the back-end of the access broker in the cloud computing environment 102. At block 610, in response to the connection request, the access broker 110 analyzes an environmental state (e.g., environmental state 114) and a user context (e.g., user context 116) to determine an overall context of the surrounding events in real-time (e.g., at a time when the connection request is received). At block 612, the access broker 110 determines whether the environmental state and/or user context satisfies one or more predetermined criteria for granting authorization to the selected infrastructure component based in part on the authentication. As noted, the predetermined criteria can be based on one or more rules (e.g., rules 304) specified by a cloud computing user and/or machine learning.

If the access broker 110 determines that the one or more criteria have not been satisfied, the access broker 110 transmits an access denial, e.g., in response to the connection request for the selected infrastructure component (block 618). On the other hand, if the access broker 110 determines that the one or more criteria have been satisfied, the access broker 110 retrieves a time bound access credential (e.g., access token) for the selected infrastructure component (e.g., via a token service 130) (block 614). The access broker 110 then transmits the time bound access credential to the user (block 616). The method 600 may then exit.

Figure 7:
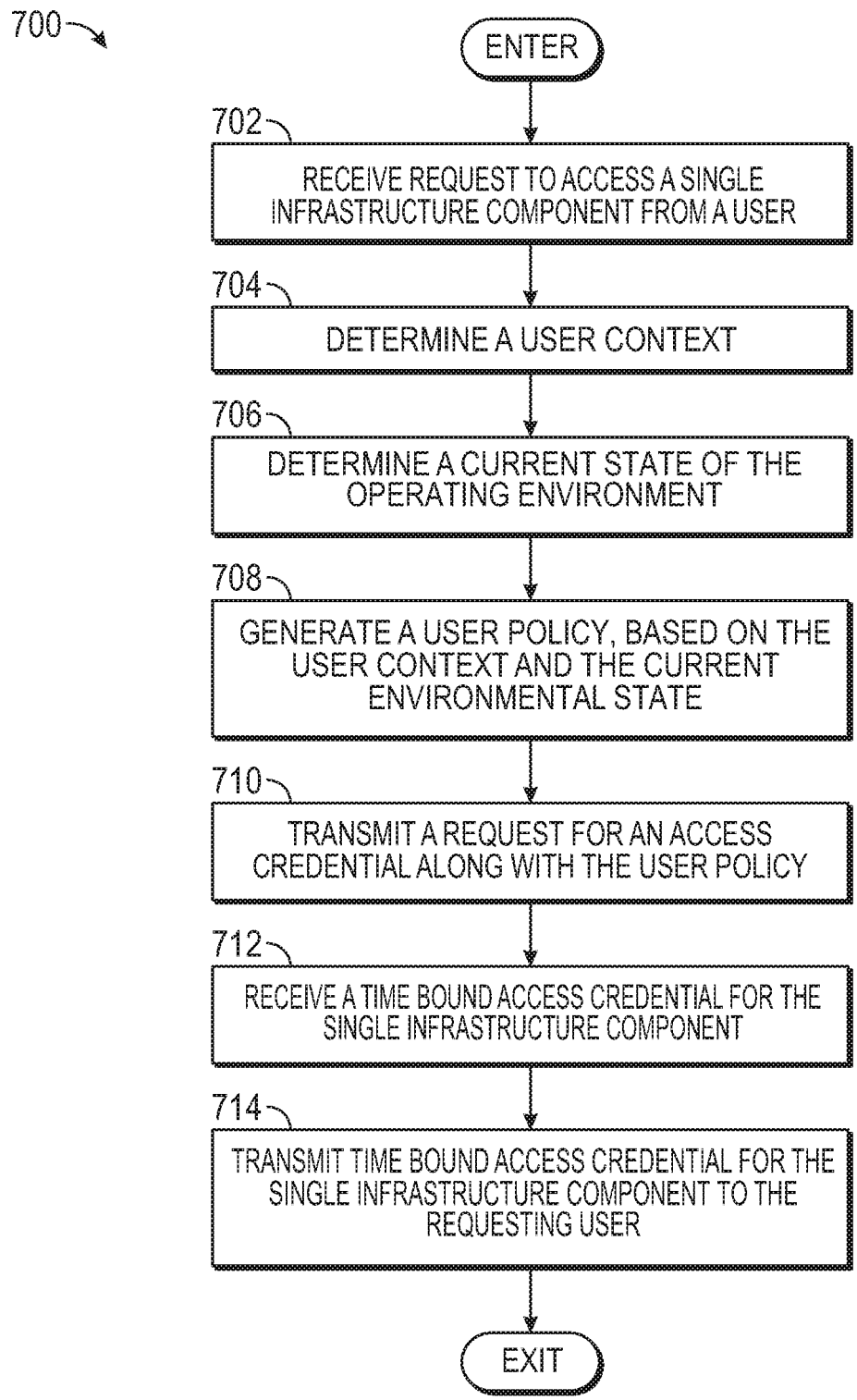
FIG. 7 is a flowchart of a method for making an authorization decision to grant an operator non-persistent access to a specific infrastructure component hosted in a cloud computing environment, according to one embodiment.

FIG. 7 is a flowchart of a method 700 for making an authorization decision to grant an operator non-persistent access to a specific infrastructure component hosted in a cloud computing environment based on a context of surrounding events, according to one embodiment. The method 700 may be performed by the (back-end) access broker 110.

The method 700 may enter at block 702, where the access broker 110 receives a (connection) request from a user (e.g., user 100) to access a single infrastructure component (e.g., infrastructure component 104-1) hosted in a cloud computing environment (e.g., cloud computing environment 102). At block 704, in response to the request, the access broker 110 determines a context of the user (e.g., user context 116). At block 706, in response to the request, the access broker 110 determines a current state of the operating environment (e.g., environmental state 114). At block 708, the access broker 110 generates a user policy (e.g., policy 306), based on the user context and the current environmental state. As noted, the user policy is a dynamic scoping policy (generated after receiving the connection request) that includes a limited set of permissions regarding the user's access to the infrastructure components hosted in the cloud computing environment, e.g., compared to the policy (or set of permissions) associated with the user received from the authentication service.

At block 710, the access broker 110 transmits a request for an access credential (e.g., access token) to a token service (e.g., token service 130) in the cloud computing environment. The request may include the generated user policy and a reference to a role of the user (where the role is associated with an initial set of permissions or policies received from the authentication service). At block 712, the access broker 110 receives a time bound access credential specifically scoped to the single infrastructure component, in response to the request. As noted, the time bound access credential may include a set of permissions that represent the intersection between the generated user policy and the initial policies associated with the role of the user. At block 714, the access broker 110 transmits the time bound access credential for the single infrastructure component to the requesting user. The user, in turn, can use the access credential to access the single infrastructure component in the cloud computing environment, via another computing system (e.g., management server 150). The method 700 may then exit.

Figure 8:
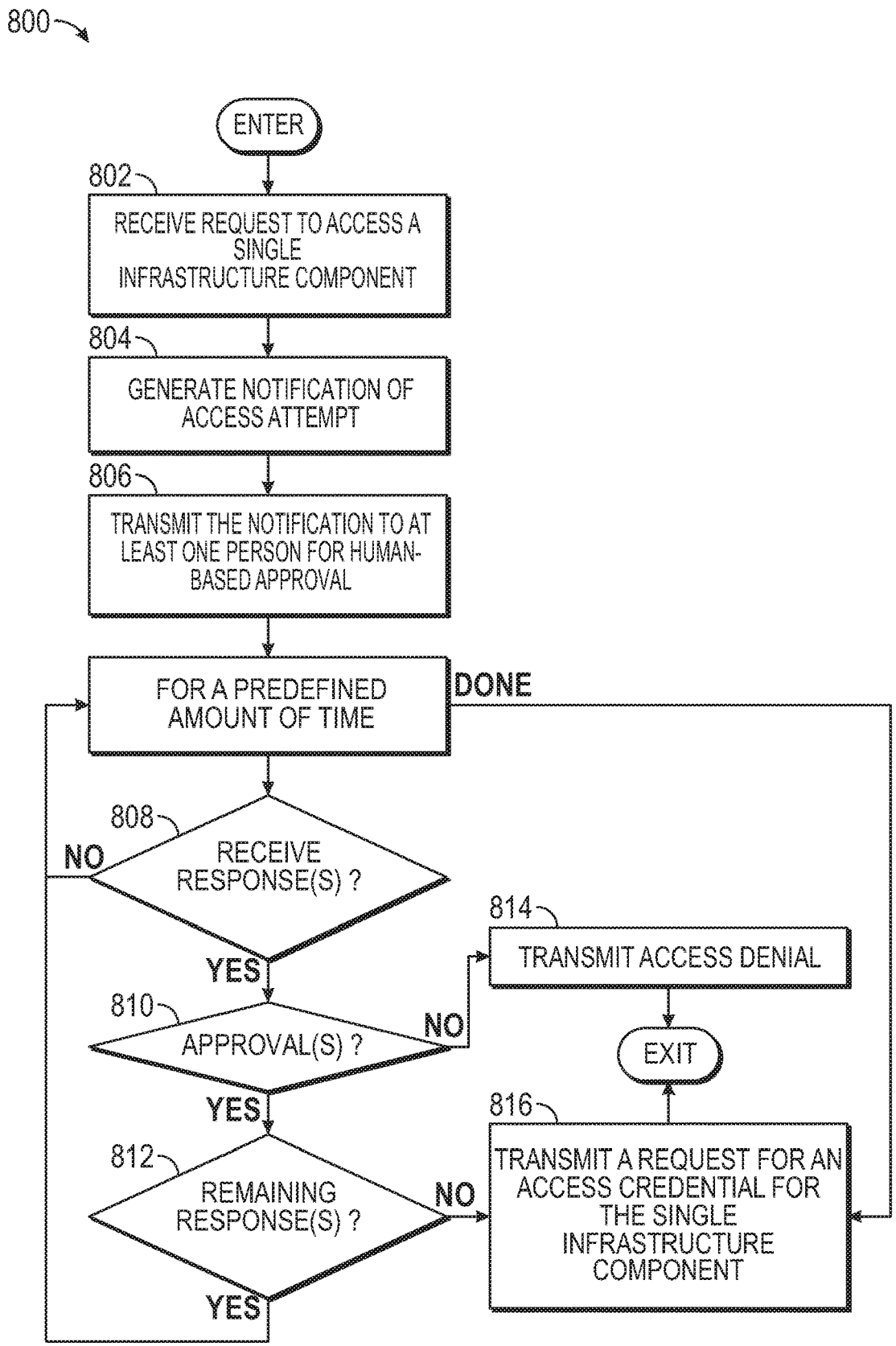
FIG. 8 is a flowchart of a method for implementing human-based approval as a condition for granting an operator non-persistent access to a specific infrastructure component hosted in a cloud computing environment, according to one embodiment.

FIG. 8 is a flowchart of a method 800 for implementing human-based approval as a condition for granting an operator non-persistent access to a specific infrastructure component hosted in a cloud computing environment, according to one embodiment. The method 800 may be performed by the (back-end) access broker 110. The method 800 may be performed for human-based approval by a single person (e.g., single user 400) or for human-based approval by multiple persons (e.g., multiple users 400, such as two-person rule).

The method 800 may enter at block 802, where the access broker 110 receives a request from a user (e.g., user 100) to access a single infrastructure component (e.g., infrastructure component 104-1) hosted in a cloud computing environment (e.g., cloud computing environment 102). At block 804, the access broker 110 generates a notification (e.g., notification 504) of the access attempt. At block 806, the access broker transmits the notification to at least one person (e.g., user 400) for human-based approval.

For a predetermined amount of time after transmitting the notification, the access broker 110 determines whether a response (e.g., approval indication 510) has been received from each person (block 808). If no response(s) has been received, the access broker 110 continues to perform block 808 until an end of the predefined amount of time. After the predefined amount of time has expired, the access broker 110 transmits a request for an access credential (e.g., access token) for the single infrastructure component to a token service (e.g., token service 130) (block 816).

On the other hand, if the access broker 110 (at block 808) receives at least one response, the access broker 110 determines whether the at least one response indicates an approval (block 810). If the at least one response does not indicate approval, the access broker 110 transmits an access denial message to the user (block 814). If the at least one response indicates an approval, the access broker 110 determines whether there are any remaining response(s) that have yet to be received by the access broker 110 (block 812). If the access broker 110 determines there are no remaining responses (e.g., the access broker 110 may have transmitted the notification to a single person or received all responses), the access broker 110 transmits the access credential request (block 816).

On the other hand, the access broker 110 (at block 812) may determine that there is at least one remaining response that has not been received by the access broker 110. For example, at block 806, the access broker 110 may have transmitted the notification to two persons and, at block 808, the access broker 110 may have received a response from one of the two persons. In this example, at block 812, the access broker 110 may determine that there is another response (e.g., from the other of the two persons) that has not been received, and may proceed to block 808 to wait for the remaining response (e.g., assuming the predefined amount of time has not expired). Here, if the access broker 110 has received a single approval from the first person and no response from the second person (and the predefined amount of time has expired), the access broker 110 can proceed to transmit the access credential request (block 816).

Figure 9:
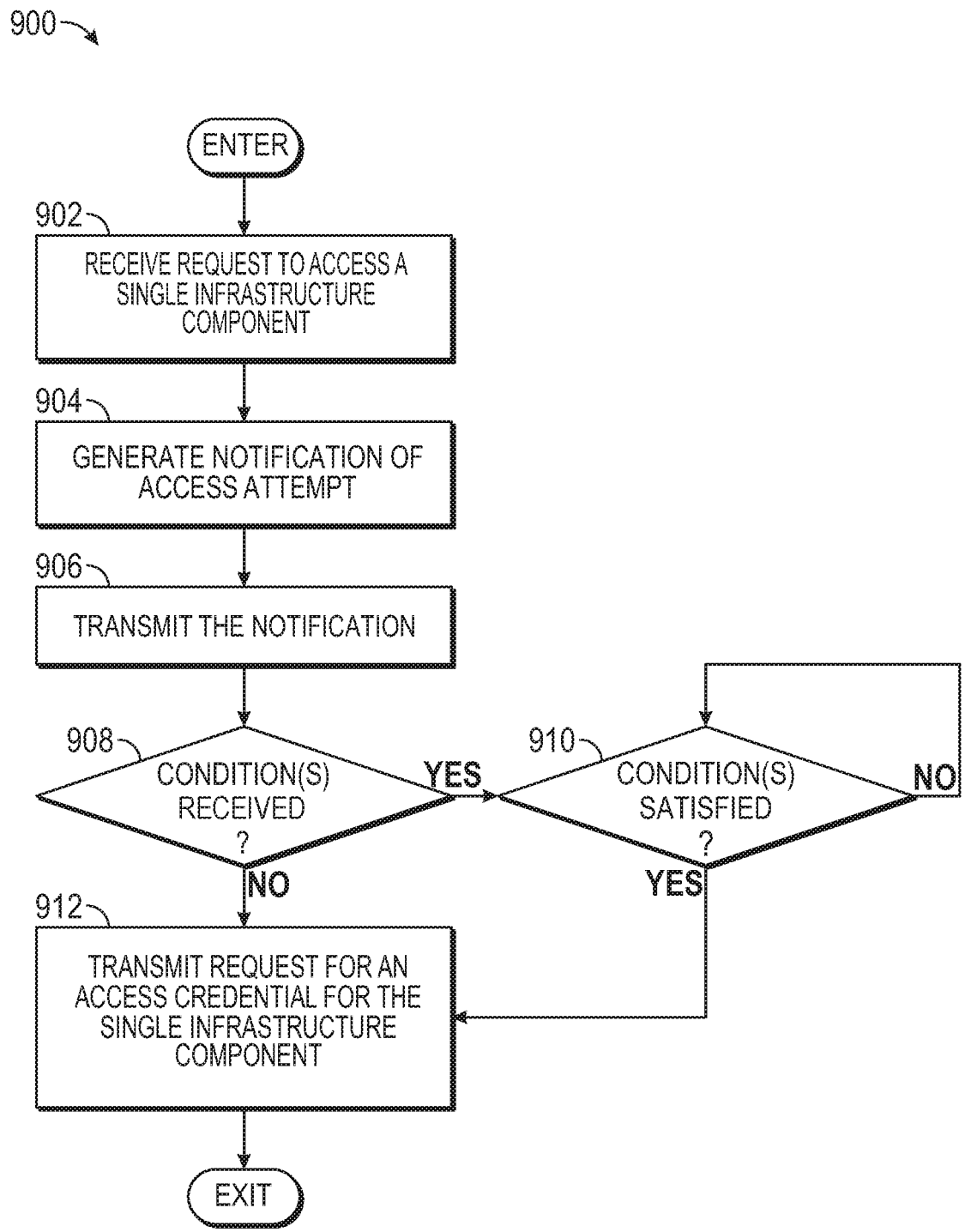
FIG. 9 is a flowchart of a method for implementing additional access control conditions when determining whether to grant non-persistent access to a specific infrastructure component hosted in a cloud computing environment, according to one embodiment.

FIG. 9 is a flowchart of a method 900 for implementing additional access control conditions when determining whether to grant an operator access to a specific infrastructure component hosted in a cloud computing environment, according to one embodiment. The method 900 may be performed by the (back-end) access broker 110.

The method 900 may enter at block 902, where the access broker 110 receives a request from a user (e.g., user 100) to access a single infrastructure component (e.g., infrastructure component 104-1) hosted in a cloud computing environment (e.g., cloud computing environment 102). At block 904, the access broker 110 generates a notification of the access attempt. In one embodiment, the notification may include at least one of: an indication of the access attempt, the user context (e.g., user context 116), and the environmental state (e.g., environmental state 114). At block 906, the access broker 110 transmits the notification to at least one of another user (e.g., user 400) or to a computing system (e.g., validation tool 140).

At block 908, the access broker 110 determines whether one or more access conditions (e.g., access conditions 142) have been received (e.g., from the other user or the computing system) in response to the notification transmitted at block 906. In one embodiment, the access broker 110 may wait a predetermined amount of time after transmitting the notification before determining that an access condition has not been received. For example, if the access broker 110 determines that an access condition has not been received after the predetermined amount of time has elapsed, the access broker 110 transmits a request for a credential (e.g., access token) for the single infrastructure component (block 912). In another embodiment, the access broker 110 may receive an indication (e.g., from the other user or the computing system) that there are no access conditions. In this case, the access broker 110 can proceed to block 912 without waiting for the predetermined amount of time to elapse.

On the other hand, if the access broker 110 determines that at least one access condition has been received (block 908), the access broker 110 determines whether the at least one access condition has been satisfied or implemented (block 910). If not, the access broker 110 continues to wait for the at least one access condition to be satisfied. Once the access broker 110 determines the at least one condition has been satisfied, the access broker 110 transmits the request for the access credential for the single infrastructure component (block 912). The method 900 may then exit.

Figure 10:
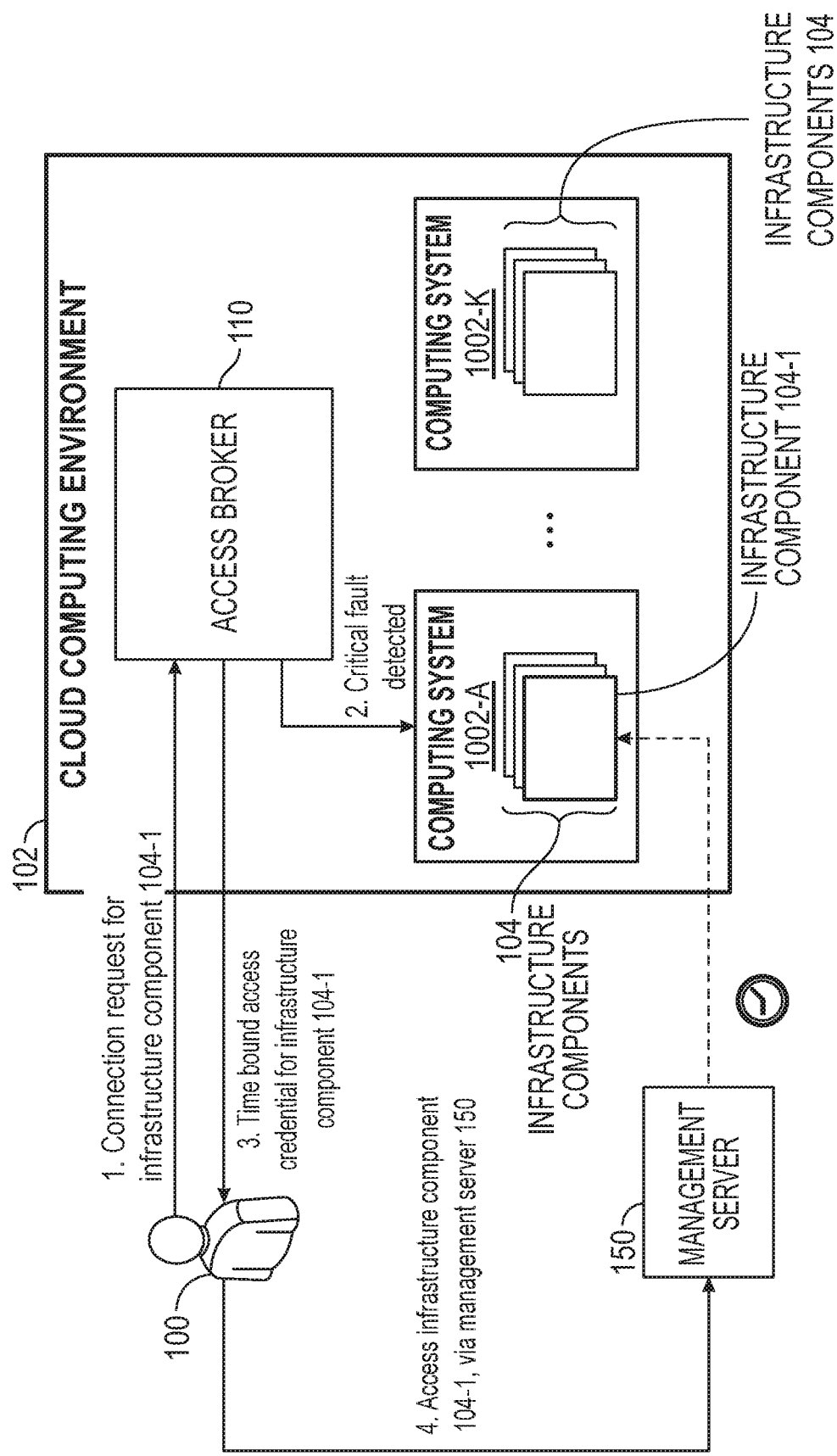
FIG. 10 illustrates an example scenario of an access broker making an authorization decision regarding non-persistent access to an infrastructure component hosted in a cloud computing environment, according to one embodiment.

FIG. 10 illustrates an example scenario of the access broker 110 making an authorization decision regarding non-persistent access to an infrastructure component hosted in a cloud computing environment based on an environmental operating state, according to one embodiment. As shown in this scenario, after receiving a connection request for infrastructure component 104-1 (step 1), the access broker 110 may detect a critical fault on one of the computing systems 1002 A-K used to host the infrastructure components 104 in the cloud computing environment 102.

Here, the access broker 110 detects a critical fault on the computing system 1002-A, which hosts infrastructure component 104-1 (step 2). In one embodiment, the critical fault may be due to a level (or amount) of resources in the computing system 1002-A that is available to the infrastructure component 104-1 being below a threshold amount of resources. The resources, for example, can include CPU(s), memory, disk (or storage) space, etc. In another embodiment, the critical fault may be due to the computing system 1002-A and/or the infrastructure component 104-1 experiencing a crash. In another embodiment, the critical fault may be due to an application executing on the infrastructure component 104-1 receiving an amount of error messages above a threshold.

In this scenario, the access broker 110 can determine (e.g., based on rules provided by the cloud computing user and/or according to rules generated from machine learning techniques) that the presence of the critical fault warrants granting the user 100 access to the specific infrastructure component 104-1. As shown, the access broker 110 returns a time-bound access credential for the infrastructure component 104-1 to the user 100 (step 3), which uses the access credential to connect to the infrastructure component 104-1, via the management server 150 (step 4). Although not shown, in the absence of the critical fault, the access broker 110 may determine that access to the specific infrastructure component 104-1 is not warranted. For example, the infrastructure component 104-1 may have already been accessed by the user 100 (or another user), the scheduled time for performing maintenance may not have occurred, a threshold number of computing systems 1002 are operating normally, etc. If the access broker 110 determines that access to the specific infrastructure component is not warranted, the access broker 110 can transmit an access denial message to the user 100. In yet another example, if the access broker 110 is unable to determine the type of fault (e.g., an unknown fault occurs that the access broker 110 cannot understand), the access broker 110 can route the authorization decision to another person for a human-based decision.

Figure 11:
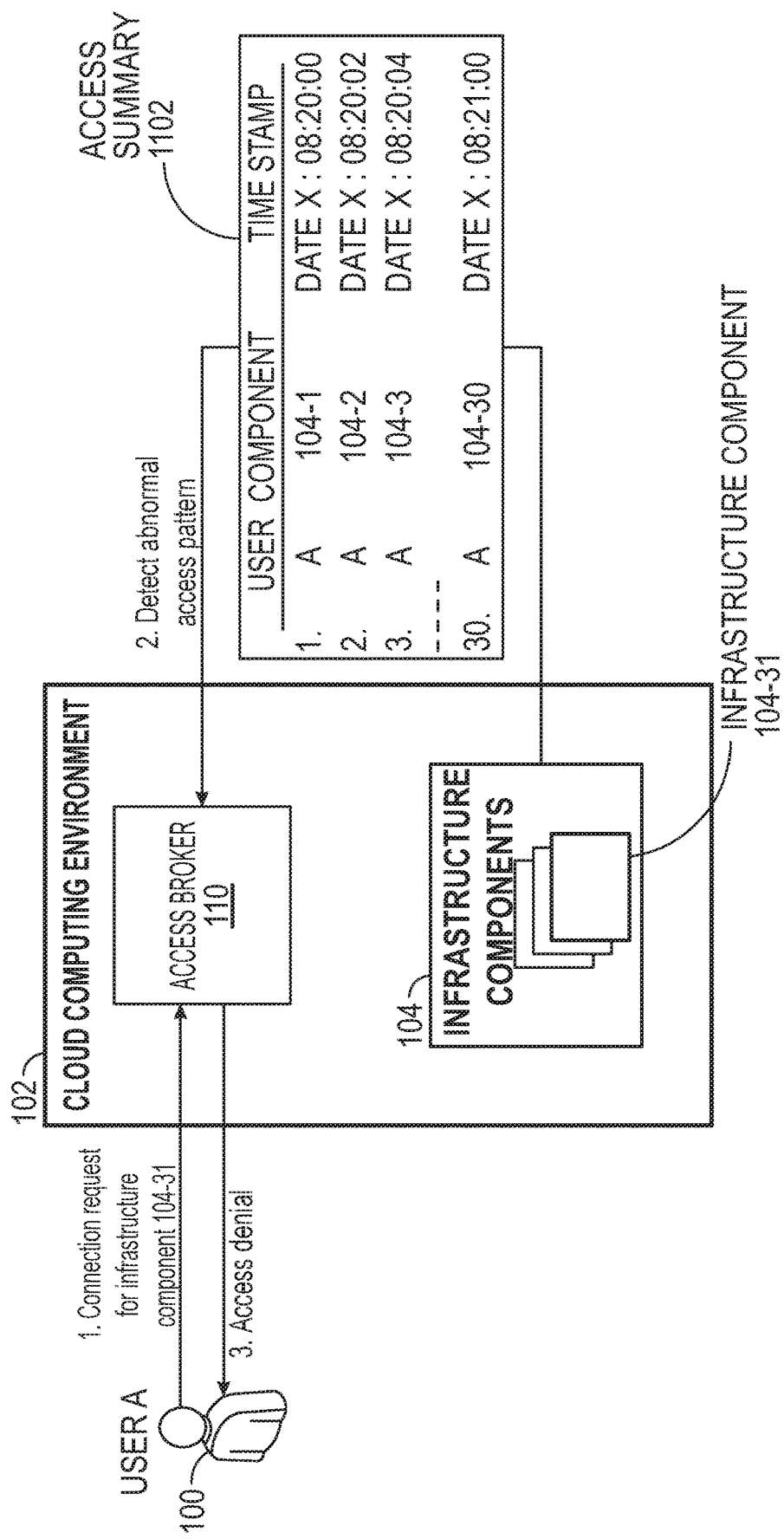
FIG. 11 illustrates another example scenario of an access broker making an authorization decision regarding non-persistent access to an infrastructure component hosted in a cloud computing environment, according to one embodiment.

FIG. 11 illustrates an example scenario of the access broker 110 making an authorization decision regarding non-persistent access to an infrastructure component hosted in a cloud computing environment based on a user context, according to one embodiment. As shown in this scenario, after receiving a connection request for infrastructure component 104-31 (step 1), the access broker 110 may retrieve an access summary 1102 indicating a history of connections (or at least connection requests) by the user 100 (e.g., user A) within a predetermined time period. Here, the access summary 1102 indicates that the user 10 (e.g., user A) has connected to (or at least requested connections to) thirty different infrastructure components 104 1-30 within one minute.

In this particular example, the access broker 110 determines, based on the access summary 1102, that the volume of the user 100's connections to different infrastructure components 104 within a short amount of time (e.g., one minute) is abnormal (step 2). In another example, the access broker 110 may determine that the access pattern is abnormal based on the number of accesses being above at threshold. In another example, the access broker 110 may determine that the access pattern is abnormal based on a rate of requests received within the predetermined time period being above a threshold rate. In another example, the access broker 110 may determine that the access pattern is abnormal, due in part to the number of requests for the infrastructure component 104-1 when no error condition (or failure event) has occurred for the infrastructure component 104-1. In another example, the access broker 110 may determine that the access pattern is abnormal because of a priority of the infrastructure component 104-1 (e.g., the threshold number of allowable accesses for the infrastructure component 104-1 may be one within the predetermined period of time or even zero). In response to detecting the abnormal access pattern, the access broker 110 sends an access denial message to the user 100 (step 3), even though the user 100 has a set of permissions that indicates that the user is pre-authorized to manage (but not connect to) the infrastructure components 104, including infrastructure component 104-31.

Figure 12:
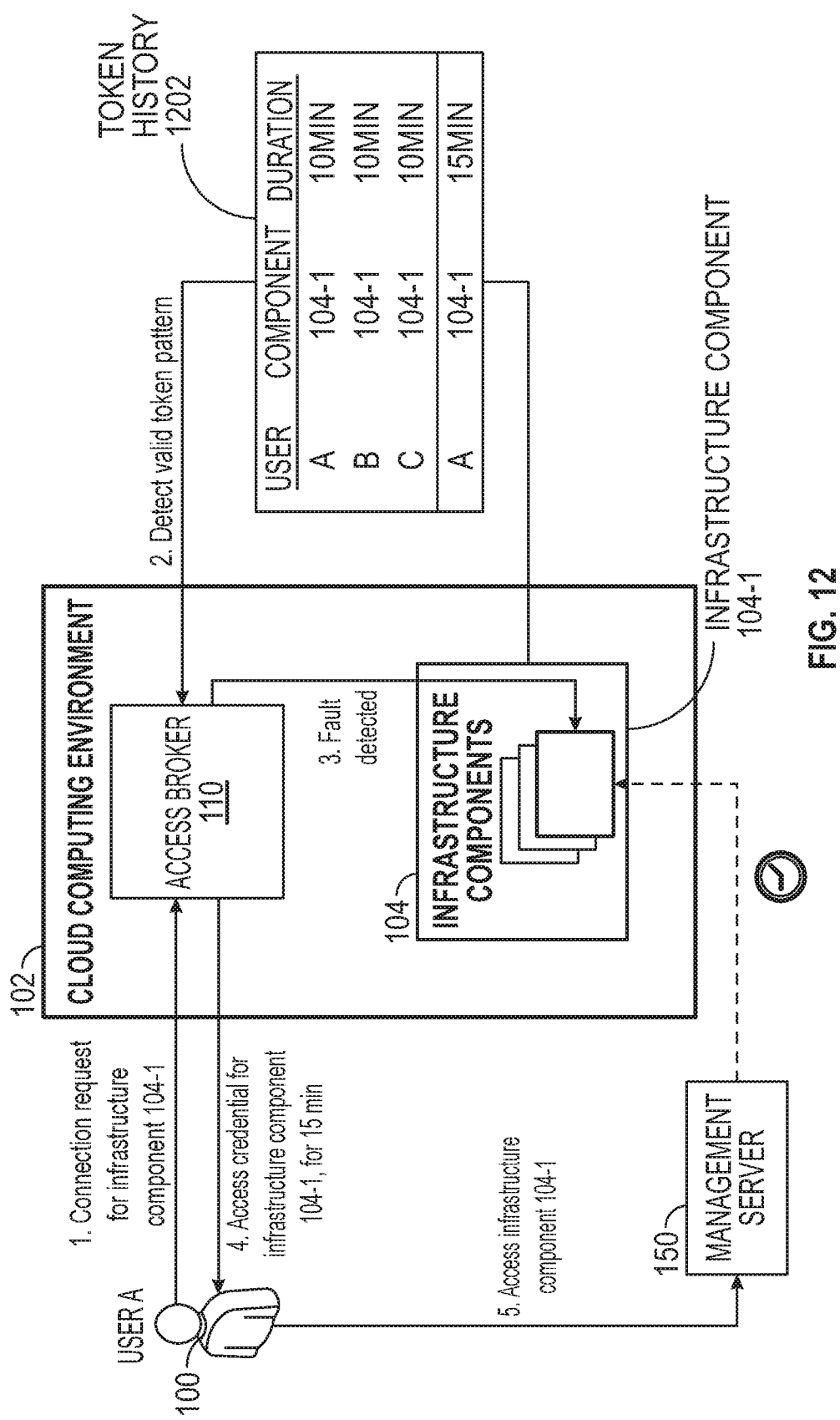
FIG. 12 illustrates yet another example scenario of an access broker making an authorization decision regarding non-persistent access to an infrastructure component hosted in a cloud computing environment, according to one embodiment.

FIG. 12 illustrates an example scenario of the access broker 110 making an authorization decision regarding non-persistent access to an infrastructure component hosted in a cloud computing environment based on a user context and/or environmental operating state, according to one embodiment. As shown in this scenario, after receiving a connection request for infrastructure component 104-1 (step 1), the access broker 110 may retrieve a token history 1202 for the infrastructure component 104-1, indicating which users have received a token to access the infrastructure component 104-1 within a predetermined time period (e.g., previous 24 hours) and the amount of time (or duration or time-to-live) of each token. Although not shown, the token history 1202 may also indicate the reason or allowed operation for each token. Here, the token history 1202 indicates that the user 100 (e.g., user A) has received two tokens to access the infrastructure component 104-1 in the previous predetermined time period. The token history 1202 can also indicate that, in both times the user 100 was granted a token, the token was used to resolve a fault (e.g., system crash, excessive number of error messages, etc.) detected on the infrastructure component 104-1.

In one embodiment, the access broker 110 can determine (e.g., based on rules provided by the cloud computing user and/or from machine learning techniques) that the valid token pattern warrants granting the user 100 access to the specific infrastructure component 104-1. For example, the access broker 110 may determine that the token pattern is valid based on a number of tokens within the predetermined time period being below a threshold number of tokens. In another example, the access broker 110 may determine that the token pattern is valid based on a rate of tokens issued to the user 100 being below a threshold rate. In another example, the access broker 110 may determine that the token pattern is valid based on the average duration of the tokens being below a threshold duration. In yet another example, the access broker 110 may determine that the token pattern is valid based on the tokens being used to resolve a fault detected on the infrastructure component 104-1.

Additionally or alternatively, the access broker 110 can determine to grant the user authorization to access the specific infrastructure component 104-1 based on a current fault detected on infrastructure component 104-1 (step 3). The access broker 110 can use the token history 1202 to identify whether the fault occurred previously and select a time duration for the current token, based in part on the time duration associated with the similar previous fault. In this case, the access broker 110 determines that the fault detected on infrastructure component 104-1 is similar to a fault in the token history 1202 in which the user 100 was granted a token that lasted for 15 minutes. As shown, in step 4, the access broker 110 can return to the user 100 an access credential for infrastructure component 104-1 having a duration of 15 minutes. In step 5, the user 100 uses the access credential to connect to the infrastructure component 104-1.

Figure 13:
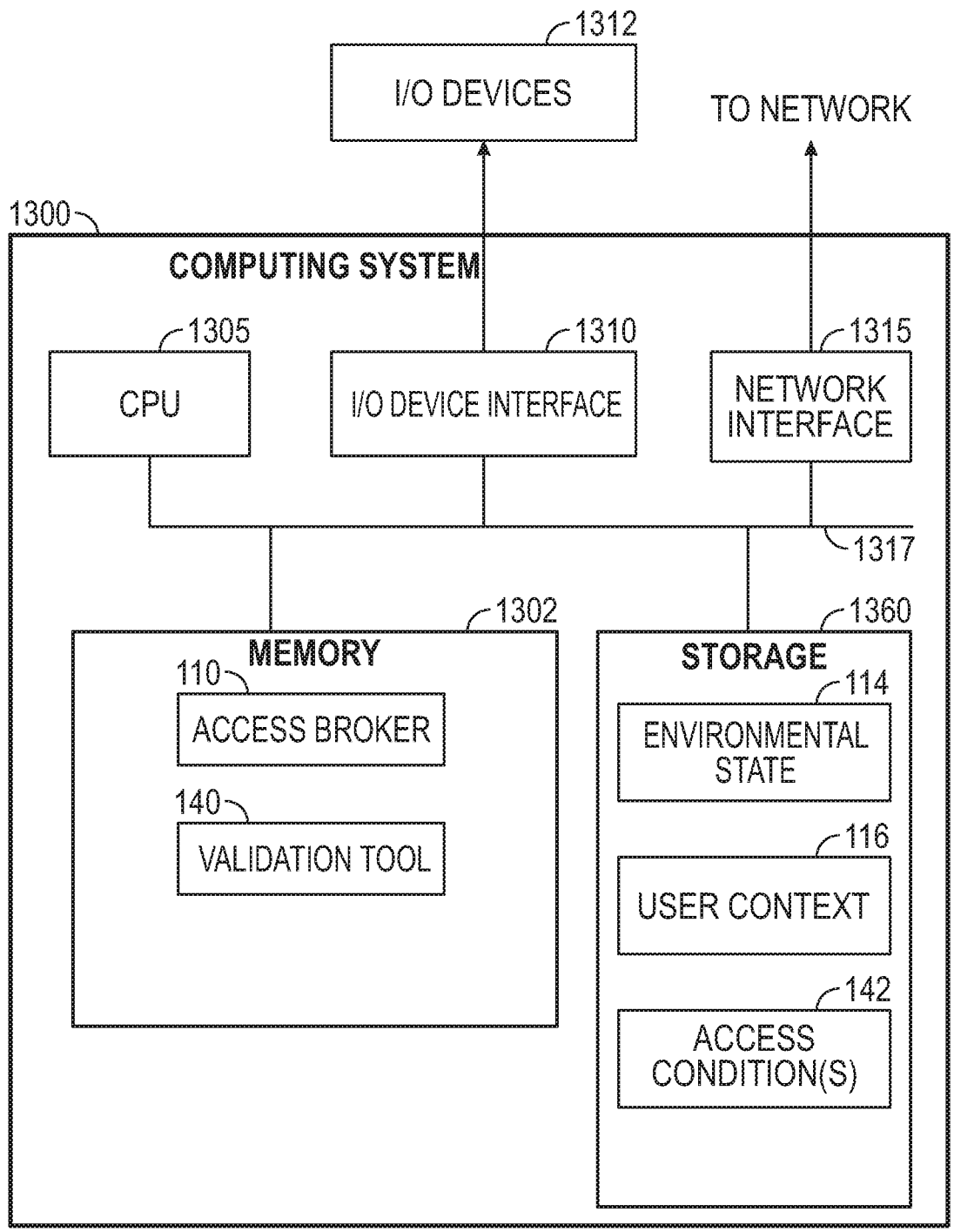
FIG. 13 illustrates an example computing system with an access broker, according to one embodiment.

FIG. 13 illustrates a computing system 1300 configured to manage non-persistent operator access to infrastructure components hosted in a cloud computing environment, according to one embodiment. As shown, the computing system 1300 includes, without limitation, a central processing unit (CPU) 1305, a network interface 1315, a memory 1320, and storage 1360, each connected to a bus 1317. The computing system 1300 may also include an I/O device interface 1310 connecting I/O devices 1312 (e.g., keyboard, mouse, and display devices) to the computing system 1300. Further, in context of this disclosure, the computing elements shown in the computing system 1300 may correspond to a physical computing system (e.g., a system in a data center) or may be a virtual computing instance executing within a computing cloud.

The CPU 1305 retrieves and executes programming instructions stored in the memory 1320 as well as stores and retrieves application data residing in the memory 1320. The interconnect 1317 is used to transmit programming instructions and application data between CPU 1305, I/O devices interface 1310, storage 1360, network interface 1315, and memory 1320. Note CPU 1305 is included to be representative of a single CPU, multiple CPUs, a single CPU having multiple processing cores, and the like. Memory 1320 is generally included to be representative of a random access memory. The storage 1360 may be a disk drive storage device. Although shown as a single unit, storage 1360 may be a combination of fixed and/or removable storage devices, such as fixed disc drives, removable memory cards, or optical storage, network attached storage (NAS), or a storage area-network (SAN). The storage 1360 includes an environmental state 114, a user context 116, and access condition(s) 142, all of which are described in more detail above. Illustratively, the memory 1320 includes the access broker 110, which is described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., access broker 110, authentication service 120, token service 130, validation tool 140, management server 150, and infrastructure components 104) or related data available in the cloud. For example, the access broker 110 could execute on a computing system in the cloud and interact with other services/components (e.g., authentication service 120, token service 130, validation tool 140) to manage non-persistent operator access to resources (e.g., infrastructure components 104) hosted in the cloud. In such a case, the access broker 110 could monitor access requests received from users and store information regarding the requests at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing instructions, which, when executed on one or more computing systems, perform an operation for managing non-persistent access to instances hosted in a cloud computing environment, the operation comprising:

receiving, at a front-end of an application, a first request from a user to access the cloud computing environment, wherein the user has a set of permissions that do not allow the user to connect to the instances hosted in the cloud computing environment;

transmitting, from the front-end of the application, a second request to authenticate the user to an authentication service in the cloud computing environment;

receiving, by the front-end of the application in response to the second request, a first credential that permits the user to access the cloud computing environment, the first credential comprising the set of permissions;

determining, by the front-end of the application, a set of the instances which the user can gain permission to access, based on the set of permissions;

upon determining, by the front-end of the application, that the user has selected a single instance within the set of instances to request access to, transmitting, from the front-end of the application, a request to access the single instance to a back-end of the application;

determining, by the back-end of the application, at least one of a current operating state of the cloud computing environment and a context of the user;

determining, by the back-end of the application, whether to grant the user access to the single instance, based on an analysis of at least one of the current operating state and the context of the user; and providing, by the back-end of the application in response to the request to access the single instance, an indication of the determination whether to grant the user access to the single instance to the front-end of the application.

2. The computer-readable storage medium of claim 1, wherein determining the set of instances which the user can gain permission to access comprises triggering, via an event-driven computing service, the back-end of the application to (i) retrieve the set of instances corresponding to the set of permissions from a computing system in the cloud computing environment responsible for managing the instances and (ii) transmit a message comprising an indication of the set of instances to the front-end of the application.

3. The computer-readable storage medium of claim 1, further comprising retrieving a second credential to access the single instance from a token service in the cloud computing environment if the determination is to grant the user access to the single instance, wherein the second credential is valid for a temporary amount of time, the temporary amount of time being determined based on the analysis of at least one of the current operating state and the context of the user.

4. The computer-readable storage medium of claim 3, wherein the indication of the determination whether to grant the user access to the single instance comprises an access grant message with the second credential.

5. The computer-readable storage medium of claim 1, wherein the indication of the determination whether to grant the user access to the single instance comprises an access denial message if the determination is to deny the user access to the single instance.

6. The computer-readable storage medium of claim 1, wherein:

determining whether to grant the user access to the single instance comprises determining whether at least one of the current operating state and the context of the user satisfy one or more conditions provided by a tenant of the cloud computing environment; and the instances hosted in the cloud computing environment are allocated to the tenant for running applications of the tenant.

7. A computer-implemented method to manage non-persistent access to infrastructure components hosted in a cloud computing environment, the computer-implemented method comprising:

receiving a request to access a single infrastructure component of the infrastructure components;

determining, in response to the request, at least one of a current operating state of the cloud computing environment and a user context;

upon determining, based on an analysis of at least one of the current operating state and the user context, to grant access to the single infrastructure component:

generating a first set of permissions that indicate access to the single infrastructure component is allowed, based on the analysis of at least one of the current operating state and the user context;

retrieving, using the first set of permissions, a credential that is (i) specific to the single infrastructure component and (ii) valid for a temporary amount of time; and transmitting the credential.

8. The computer-implemented method of claim 7, wherein determining the current operating state of the cloud computing environment comprises obtaining a configuration of a computing system hosting the single infrastructure component.

9. The computer-implemented method of claim 8, wherein determining the current operating state of the cloud computing environment comprises invoking a function by an event-driven computing service to obtain the configuration of the computing system hosting the single infrastructure component.

10. The computer-implemented method of claim 8, wherein the configuration indicates at least one of: an amount of resources of the computing system available to the single infrastructure component; whether a fault has occurred on the computing system; and a number of error messages received by an application being executed by the single infrastructure component.

11. The computer-implemented method of claim 10, wherein determining to grant access to the single infrastructure component comprises determining at least one of: (i) the amount of resources is less than a threshold amount of resources; (ii) a fault has occurred on the computing system; and (iii) the number of error messages is above a threshold number of error messages.

12. The computer-implemented method of claim 7, wherein determining the user context comprises obtaining at least one of: (i) a history of access attempts to the single infrastructure component by a user requesting access to the single infrastructure component and (ii) a history of credentials granted to the user for the single infrastructure component.

13. The computer-implemented method of claim 12, wherein determining the user context comprises invoking a function by an event-driven computing service to obtain at least one of the (i) the history of access attempts and (ii) the history of credentials.

14. The computer-implemented method of claim 12, further comprising determining, based on an analysis of the user context, at least one of: (i) a number of access attempts to the single infrastructure component by the user; (ii) a rate of access attempts to the single infrastructure component by the user; (iii) a number of credentials previously issued to the user; (iv) a rate of credentials previously issued to the user; and (v) an average duration of the credentials previously issued to the user for the single infrastructure component.

15. The computer-implemented method of claim 14, wherein determining to grant access to the single infrastructure component comprises determining at least one of: (i) the number of access attempts is below a threshold number of access attempts; (ii) the rate of access attempts is less than a threshold rate of access attempts; (iii) the number of credentials previously issued to the user is below a threshold number of tokens; (iv) the rate of credentials previously issued to the user is less than a threshold rate; and (v) the average duration of the tokens is within a predefined range of credential durations.

16. The computer-implemented method of claim 7, wherein:

the request comprises a second set of permissions associated with a user attempting to access the single infrastructure component; and the second set of permissions do not permit the user to connect to the infrastructure components hosted in the cloud computing environment.

17. The computer-implemented method of claim 16, wherein:

retrieving the credential comprises sending a request to a token service in the cloud computing environment to generate the credential;

the request sent to the token service comprises the first set of permissions and an indication of a role of the user, the role being associated with the second set of permissions; and the credential represents a third set of permissions that is an intersection of the first set of permissions and the second set of permissions.

18. The computer-implemented method of claim 17, wherein:

the first set of permissions is generated based on a first function invoked by an event-driven computing service; and the request to the token service is sent based on a second function invoked by the event-driven computing service.

19. A computer-implemented method for managing non-persistent access to infrastructure components hosted in a cloud computing environment, the computer-implemented method comprising:

receiving a request to access a single infrastructure component of the infrastructure components hosted in the cloud computing environment;

determining at least one of a current operating state of the cloud computing environment and a context of a first user attempting to access the single infrastructure component;

transmitting a notification of the request to at least one second user; and upon determining (i) to grant access to the single infrastructure component, based on analysis of at least one of the current operating state and the context of the first user and (ii) that a response to the notification indicating approval from the at least one second user has been received or that a response to the notification has not been received from the at least one second user within a predetermined amount of time after transmitting the notification:

retrieving a credential that is (i) specific to the single infrastructure component and (ii) valid for a temporary amount of time, and transmitting the credential.

20. The computer-implemented method of claim 19, wherein the single infrastructure component comprises a virtual server instance or a relational database engine instance.

\* \* \* \* \*